United States Patent
Bar-Nahum et al.

(10) Patent No.: US 10,514,711 B2
(45) Date of Patent: Dec. 24, 2019

(54) FLIGHT CONTROL USING COMPUTER VISION

(71) Applicant: Airspace Systems, Inc., San Leandro, CA (US)

(72) Inventors: Guy Bar-Nahum, Sausalito, CA (US); Hong-Bin Yoon, San Leandro, CA (US); Karthik Govindaswamy, Milpitas, CA (US); Hoang Anh Nguyen, San Mateo, CA (US)

(73) Assignee: Airspace Systems, Inc., San Leandro, CA (US)

( * ) Notice: Subject to any disclaimer, the term of this patent is extended or adjusted under 35 U.S.C. 154(b) by 0 days.

(21) Appl. No.: 16/142,452

(22) Filed: Sep. 26, 2018

(65) Prior Publication Data
US 2019/0025858 A1  Jan. 24, 2019

Related U.S. Application Data

(63) Continuation-in-part of application No. 15/729,581, filed on Oct. 10, 2017.

(60) Provisional application No. 62/566,449, filed on Oct. 1, 2017, provisional application No. 62/405,972, filed on Oct. 9, 2016.

(51) Int. Cl.
| | |
|---|---|
| G06K 9/00 | (2006.01) |
| G05D 1/12 | (2006.01) |
| G08G 5/00 | (2006.01) |
| G05D 1/00 | (2006.01) |
| B64C 39/02 | (2006.01) |
| G05D 1/10 | (2006.01) |
| B64D 47/08 | (2006.01) |

(52) U.S. Cl.
CPC ............. *G05D 1/12* (2013.01); *B64C 39/024* (2013.01); *B64D 47/08* (2013.01); *G05D 1/0088* (2013.01); *G05D 1/101* (2013.01); *G06K 9/0063* (2013.01); *G08G 5/0013* (2013.01); *G08G 5/0069* (2013.01); *G08G 5/0078* (2013.01); *B64C 2201/141* (2013.01)

(58) Field of Classification Search
None
See application file for complete search history.

(56) References Cited

U.S. PATENT DOCUMENTS

| | | | | |
|---|---|---|---|---|
| 7,995,794 | B2 * | 8/2011 | Hope | G03B 17/38 382/103 |
| 9,031,280 | B2 * | 5/2015 | Pakulski | G06T 7/254 382/103 |
| 9,412,278 | B1 * | 8/2016 | Gong | H04L 63/101 |
| 2002/0196330 | A1 | 12/2002 | Park | |
| 2005/0021282 | A1 * | 1/2005 | Sammut | F41G 1/38 702/150 |
| 2007/0098218 | A1 * | 5/2007 | Zhang | G06K 9/00228 382/103 |

(Continued)

*Primary Examiner* — Randolph I Chu
(74) *Attorney, Agent, or Firm* — Van Pelt, Yi & James LLP

(57) ABSTRACT

A flight control operation of a reference aerial vehicle is performed. For example, an image captured by an image sensor of the reference aerial vehicle is received. A target is detected in the image. A three-dimensional relative location of the target with respect to the reference aerial vehicle is determined based on the image. The flight control operation is performed based on the three-dimensional relative location of the target with respect to the reference aerial vehicle.

20 Claims, 25 Drawing Sheets

(56) References Cited

U.S. PATENT DOCUMENTS

| | | | |
|---|---|---|---|
| 2008/0252903 A1 | 10/2008 | Boesser | |
| 2011/0054689 A1* | 3/2011 | Nielsen | G05D 1/0088 700/258 |
| 2016/0068267 A1 | 3/2016 | Liu | |
| 2016/0127641 A1* | 5/2016 | Gove | G06T 1/0007 348/143 |
| 2016/0136482 A1* | 5/2016 | Askew, Jr. | G01S 19/19 700/91 |
| 2016/0202695 A1 | 7/2016 | Deroos | |
| 2016/0219248 A1* | 7/2016 | Reznik | H04N 21/2343 |
| 2016/0246297 A1 | 8/2016 | Song | |
| 2016/0253808 A1* | 9/2016 | Metzler | B64C 39/024 382/103 |
| 2016/0307447 A1* | 10/2016 | Johnson | G05D 1/0044 |
| 2017/0161907 A1 | 6/2017 | Malecki | |
| 2018/0046187 A1* | 2/2018 | Martirosyan | G05D 1/0094 |
| 2018/0074519 A1* | 3/2018 | Qin | B64C 39/024 |
| 2018/0164799 A1* | 6/2018 | Hong | G05D 1/00 |
| 2018/0204331 A1* | 7/2018 | Omari | H04N 5/23222 |
| 2018/0218618 A1* | 8/2018 | Rysdyk | B64C 39/024 |
| 2018/0288586 A1* | 10/2018 | Tran | A63B 69/38 |
| 2018/0330623 A1* | 11/2018 | Fujita | |
| 2018/0331738 A1* | 11/2018 | Agrawal | H04B 7/0608 |
| 2019/0019141 A1* | 1/2019 | Torii | B64C 39/024 |

\* cited by examiner $$UD = \sin(0.01745 * degY)$$

Equation 1

$$FB = \cos(0.01745 * degY)$$

Equation 2

$$LR = \sin(0.01745 * degX)$$

Equation 3

FIG. 8

$$UD_{smooth} = ud_{factor} * UD$$

Equation 4

$$FB_{smooth} = speedfactor * FB$$

Equation 5

$$LR_{smooth} = speedfactor * LR$$

Equation 6

$$speedfactor(degX) = a/(1 + bc^{-degX})$$

Equation 7

$$speedfactor(degY) = a/(1 + bc^{-degY})$$

Equation 8

FIG. 10

FLIGHT CONTROL USING COMPUTER VISION

CROSS REFERENCE TO OTHER APPLICATIONS

This application claims priority to U.S. Provisional Patent Application No. 62/566,449 entitled FLIGHT CONTROL FROM 2D VISION filed Oct. 1, 2017 which is incorporated herein by reference for all purposes.

This application is a continuation-in-part of co-pending U.S. patent application Ser. No. 15/729,581 entitled SPATIO-TEMPORAL AWARENESS ENGINE FOR PRIORITY TREE BASED REGION SELECTION ACROSS MULTIPLE INPUT CAMERAS AND MULTIMODAL SENSOR EMPOWERED AWARENESS ENGINE FOR TARGET RECOVERY AND OBJECT PATH PREDICTION filed Oct. 10, 2017, which claims priority to U.S. Provisional Patent Application No. 62/405,972 entitled MULTIMODAL SENSOR EMPOWERED AWARENESS ENGINE FOR TARGET RECOVERY AND OBJECT PATH PREDICTION filed Oct. 9, 2016, both of which are incorporated herein by reference for all purposes.

BACKGROUND OF THE INVENTION

Typically unmanned aerial vehicles and drones are controlled using flight controllers manually operated by a human user. This requires the human user to have a visual sight of the aerial vehicle and/or an image captured by the aerial vehicle. However, this may be challenging in circumstances where a trained human user is unavailable or unable to react quickly enough to perform a desired flight maneuver. Additionally if communication between the aerial vehicle and the flight controller is lost or becomes unreliable, the aerial vehicle may be unable to complete a desired flight operation.

BRIEF DESCRIPTION OF THE DRAWINGS

Various embodiments of the invention are disclosed in the following detailed description and the accompanying drawings.

FIG. 8 shows example equations that can be utilized to determine a three dimensional vector.

FIG. 10 shows example equations that can utilized to scale/alter components values of a vector.

DETAILED DESCRIPTION

Figure 1:
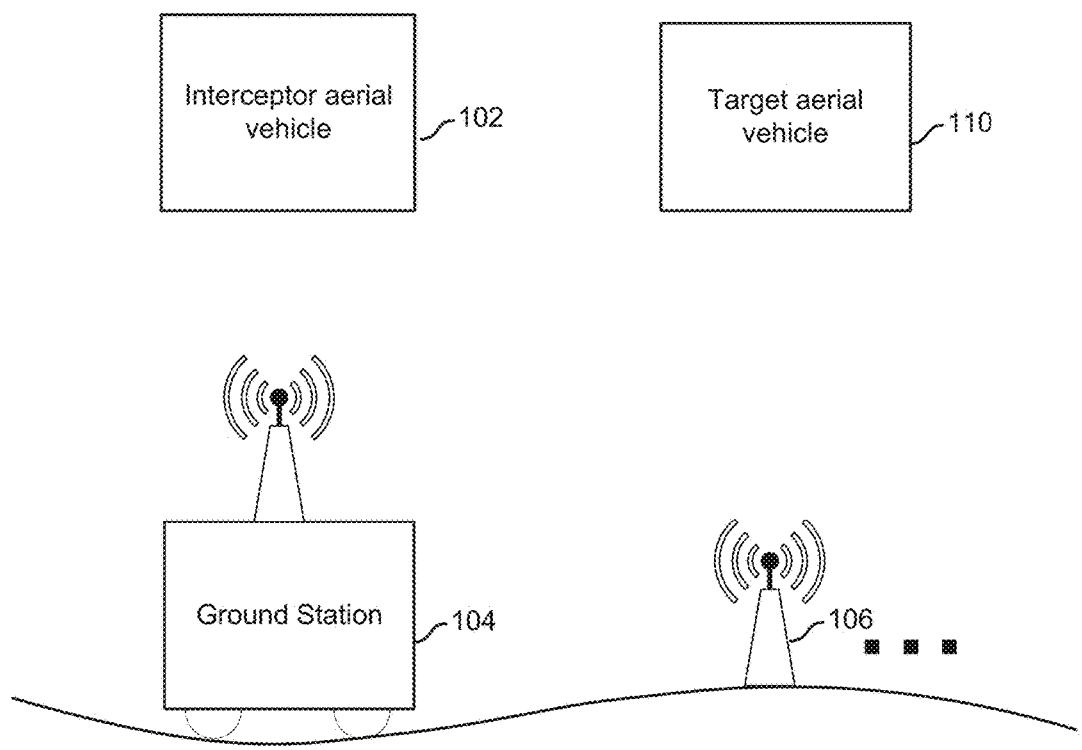
FIG. 1 a block diagram illustrating an embodiment of a system for managing an airspace.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Unmanned Aerial Platforms, including Unmanned Aerial Vehicles (UAV) and Aerial Drones, may be used for a variety of applications. However, some applications may pose a risk to people or property. UAVs have been used to carry contraband, including drugs, weapons, and counterfeit goods across international borders. It is further possible that UAVs may be used for voyeuristic or industrial surveillance, to commit terrorist acts such as spreading toxins or transporting an explosive device. In view of this risk posed by malicious UAVs, it may be necessary to have a system to intercept, capture, and transport away a UAV that has entered a restricted area.

An interceptor aerial vehicle may be utilized to monitor and/or capture offending aerial vehicles. For example, when a threatening UAV is detected, the interceptor aerial vehicle may be deployed to fly to the target UAV and capture it (e.g., using a net fired from the interceptor aerial vehicle over the target to capture the target in the net for transport to a safe location). However, because the target UAV can move, the interceptor aerial vehicle needs to be able to follow the target UAV and get close enough until the target UAV is within range of a capture system. For at least the previously mentioned reasons, it may not be desirable to manually control the interceptor aerial vehicle to follow the target UAV. In some embodiments, the interceptor aerial vehicle is able to autonomously track and fly to the target UAV using machine vision based on images captured by a camera of the interceptor aerial vehicle.

In some embodiments, an image is received and a target aerial vehicle is detected in the image. For example, a stream of images captured by one or more cameras of an interceptor aerial vehicle is analyzed using deep learning, neural networks, and/or other machine learning techniques to recognize a target aerial vehicle in the captured image. A three-dimensional relative location of the target aerial vehicle is determined with respect to a reference aerial vehicle based on the image. For example, azimuth and attitude directions as well as distance from the reference aerial vehicle are determined based on the image. A flight control operation is performed based on three-dimensional relative location. For example, the reference aerial vehicle is guided towards the three-dimensional relative location at a dynamically determined speed.

FIG. 1 a block diagram illustrating an embodiment of a system for managing an airspace. Examples of interceptor aerial vehicle 102 include a drone, a multirotor aircraft, an airplane, a UAV, a helicopter, and any other vehicle capable of flight. Interceptor aerial vehicle 102 may be deployed to patrol a specified airspace and/or monitor/interdict a target aerial vehicle. For example, interceptor aerial vehicle 102 follows and/or navigates to a location associated with the target aerial vehicle (e.g., target aerial vehicle 110). Ground station 104 is used to manage interceptor aerial vehicle 102. Ground station 104 is in communication with interceptor aerial vehicle 102. For example, ground station 104 provides instructions, commands, sensor data, and/or other data that can be used by interceptor aerial vehicle 102 to monitor an airspace and/or navigate to and/or capture a target aerial vehicle. Interceptor aerial vehicle 102 may provide status and/or reporting data back to ground station 104. Ground station 104 may include one or more sensors utilized to detect a location of aerial vehicles within an airspace. For example, ground station 104 may include one or more radars, cameras, wireless communication sensors, and/or LIDAR sensors monitoring the airspace. Ground station 104 may also receive information from one or more other ground-based sensors. One example of the ground-based sensor is ground-based sensor 106. Examples of ground-based sensor 106 may include one or more of radars, cameras, wireless communication sensors, and/or LIDAR sensors.

When an unauthorized aerial vehicle is detected (e.g., using sensors of ground station 104 and/or ground-based sensor 106), interceptor aerial vehicle 102 may be deployed to interdict/capture the unauthorized aerial vehicle. An example of the unauthorized aerial vehicle is target aerial vehicle 110 (e.g., a drone, a multirotor aircraft, an airplane, a UAV, a helicopter, or any other vehicle capable of flight). The detected location of target aerial vehicle 110 may be provided to interceptor aerial vehicle 102 to allow it to automatically and autonomously fly towards the direction of the detected location. However, once interceptor aerial vehicle 102 is near target aerial vehicle 110, the location data from ground-based sensors may not be accurate or updated fast enough for interceptor aerial vehicle 102 to get close enough to the moving target aerial vehicle 110 to reliably deploy a capture mechanism. Interceptor aerial vehicle 102 includes one or more computer vision sensors and a processor that can be used to dynamically detect the unauthorized aerial vehicle and autonomously navigate interceptor aerial vehicle 102 towards the target aerial vehicle.

In some embodiments, ground station 104 is included in a mobile platform that is able to be transported to different physical locations. For example, ground station 104 is on a movable platform with wheels that may be towed or may include an engine to also serve as a vehicle. In some embodiments, ground station 104 includes a hangar that can be used to transport and house interceptor aerial vehicle 102.

In some embodiments, ground station 104 is able to communicate in real time with the interceptor aerial vehicle 102 to be able to monitor, and if necessary, redirect detection and tracking based on security or threat level. In the example implementation, the telecommunications structure of ground station 104 is configured to receive and transmit signals. More specifically, the transmission protocol may include but is not limited to RF, wireless/WiFi, Bluetooth/Zigbee, cellular, and others. The telecommunications structure is configured to receive multiple streams of communication in different protocols, and to combine and thread the different communication inputs. Further, the telecommunications structure may also be configured to receive low altitude signals, such as light transmission in various colors, intensities, patterns and shapes, which may be used to identify a target drone. Alternatively, an aerial vehicle launched from the hangar may contain onboard processing capability to perform the substantially same detection, and provide the information to ground station 104.

The identity of the target aerial vehicle may be further compared and associated with a user by additional criteria, such as authentication of user equipment. For example, if a target drone is identified as friend or foe, at a first level of authentication, an owner or user associated with a mobile computing device may receive a query, such as a text message, email or other communication. The user may be required to authenticate ownership, operation, control, or other association with the target drone, prior to the target drone being cleared for operation. Alternatively, if the first level of authentication does not indicate that the target drone is a "friend," further targeting and interdiction may occur. Similarly, if the second level of authentication does not result in the user providing sufficient factors or clearances to confirm association with the target drone, even if the target drone is determined to be a "friend" at the first authentication stage, that classification may be converted to "foe," or the "friend" determination may not be implemented, if the second level or factor of authentication does not result in a confirmation that the user is associated with the target drone, and that the association meets the criteria for "friend" status.

In some embodiments, interceptor aerial vehicle 102 may be deployed to patrol an airspace. During patrol, the interceptor aerial vehicle and associated interface may be programmed to automatically fly a patrol path. When a target aerial vehicle is detected in proximity, the user interface may transition to another patrol path so that the user can continue to monitor patrol pads for other aerial vehicles. Similarly, the user interface may transition to interdiction mode. Thus, configurations may be provided where one or more users may continuously be in surveillance for patrol mode, and toggle or switch between multiple aerial vehicles, toggling off of aerial vehicles that have moved from surveillance mode to another mode.

Figure 2:
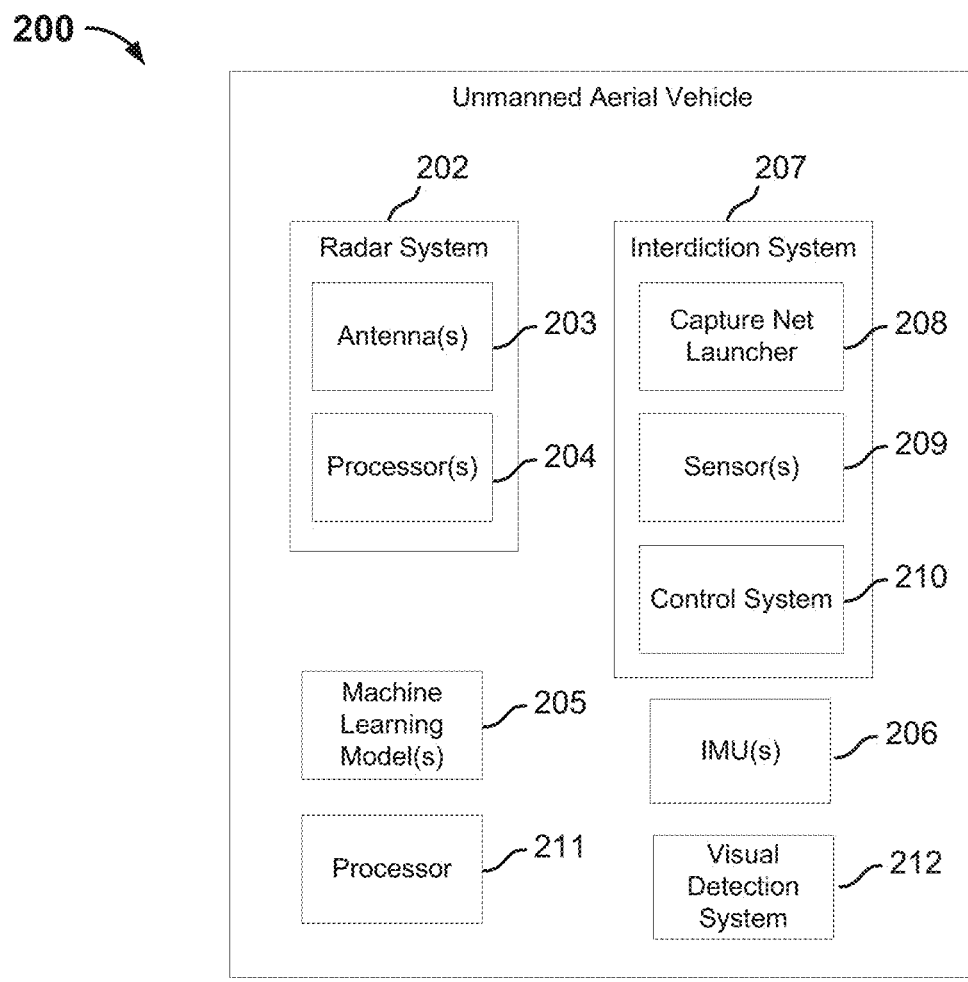
FIG. 2 is a block diagram illustrating an embodiment of an aerial vehicle.

FIG. 2 is a block diagram illustrating an embodiment of an aerial vehicle. UAV 200 is an example of aerial vehicle 102 of FIG. 1. In the example shown, UAV 200 comprises a radar system 202, one or more IMUs 206, and an interdiction system 207. UAV 200 may include one or more other systems and/or components that are not shown (e.g., propellers, flight control system, landing control system, power system, etc.).

Radar system 202 is comprised of one or more antennas 203 and one or more processors 204. The one or more antennas 203 may be a phased array, a parabolic reflector, a slotted waveguide, or any other type of antenna design used for radar. The one or more processors 204 are configured to excite a transmission signal for the one or more antennas 203. The transmission signal has a frequency $f_0$. Depending on the antenna design, the transmission signal may have a frequency between 3 MHz to 220 GHz. In some embodiments, the one or more antennas are configured to operate in a frequency range of 79 MHz to 1 GHz. In response to the excitation signal, the one or more antennas 203 are configured to transmit the signal. The transmission signal may propagate through space. The transmission signal may reflect off one or more objects. The reflection signal may be received by the one or more antennas 203. In some embodiments, the reflection signal is received by a subset of the one or more antennas 203. In other embodiments, the reflection signal is received by all of the one or more antennas 203. The strength (amplitude) of the received signal depends on a plurality of various factors, such as a distance between the one or more antennas 203 and the reflecting object, the medium in which the signal is transmitted, the environment, and the material of the reflecting object, etc.

The one or more processors 204 are configured to receive the reflection signal from the one or more antennas 203. The one or more processors 204 are configured to determine a velocity of the detected object based on the transmission signal and the reflection signal. The velocity may be determined by computing the Doppler shift. A detected object may have one or more associated velocities. An object without any moving parts, such as a balloon, may be associated with a single velocity. An object with moving parts, such as a car, helicopter, UAV, plane, etc., may be associated with more than one velocity. The main body of the object may have an associated velocity. The moving parts of the object may each have an associated velocity. For example, a UAV is comprised of a body portion and a plurality of propellers. The body portion of the UAV may be associated with a first velocity. Each of the propellers may be associated with corresponding velocities.

In some embodiments, the one or more antennas 203 are a phased antenna array. In the event the one or more antennas 203 detect an object, a beam associated with the phase antenna array may be directed towards the object. To change the directionality of the antenna array when transmitting, a beam former (e.g., the one or more processors 204) may control the phase and relative amplitude of the signal at each transmitting antenna of the antenna array, in order to create a pattern of constructive and destructive interference in the wave front.

Radar system 202 is coupled to one or more inertial measurement units 206. The one or more inertial measurement units 206 are configured to calculate attitude, angular rates, linear velocity, and/or a position relative to a global reference frame. The one or more processors 204 may use the measurements from the one or more IMUs 206 to determine an EGO motion of UAV 200. The one or more processors 204 may also use one or more extended Kalman filters to smooth the measurements from the one or more inertial measurement units 206. One or more computer vision-based algorithms (e.g., optical flow) may be used to determine the EGO motion of UAV 200. The one or more processors 204 may be configured to remove the EGO motion data of UAV 200 from the reflection signal data to determine one or more velocities associated with a detected object. From UAV 200's perspective, every detected item appears to be moving when UAV 200 is flying. Removing the EGO motion data from the velocity determination allows radar system 202 to determine which detected objects are static and/or which detected objects are moving. The one or more determined velocities may be used to determine a micro-Doppler signature of an object.

The one or more processors 204 may generate a velocity profile from the reflected signal to determine a micro-Doppler signature associated with the detected object. The velocity profile compares a velocity of the reflection signal(s) with an amplitude (strength) of the reflection signal(s). The velocity axis of the velocity profile is comprised of a plurality of bins. A velocity of the reflection signal with the highest amplitude may be identified as a reference velocity and the amplitude associated with the reference velocity may be associated with a reference bin (e.g., bin $B_0$). The one or more other velocities included in the reflection signal may be compared with respect to the reference velocity. Each bin of the velocity profile represents an offset with respect to the reference velocity. A corresponding bin for the one or more other velocities included in the reflection signal may be determined. A determined bin includes an amplitude associated with one of the one or more other velocities included in the reflection signal. For example, a reflection signal may be a reflection signal associated with a UAV. The UAV is comprised of a main body and a plurality of propellers. The velocity of a UAV body may be represented as a reference velocity in the velocity profile. The velocity of a UAV propeller may be represented in a bin offset from the reference velocity. The bin associated with the reference velocity may store an amplitude associated with the velocity of the UAV body. The bin offset from the reference bin may store an amplitude associated with the velocity of a UAV propeller.

A direction of a beam of the phased antenna array may be focused towards a detected object such that a plurality of antenna elements 203 receive a reflection signal from the detected object. The plurality of antenna elements that receive a reflection signal may be adjacent to the antenna element that detected the object during the one dimensional MIMO scan. A velocity profile for each of the received corresponding reflection signals may be generated.

The velocity profile for each of the received corresponding reflection signals may be combined with the velocity profile of the antenna element that detected the object during the one dimensional MIMO scan. The combined velocity profile includes the same bins as one of the velocity profiles, but a bin of the combined velocity profile stores a plurality of amplitudes from the plurality of velocity profiles. A maximum amplitude value (peak) may be selected for each bin of the combined velocity profile. The maximum amplitude bin values may be used in a feature vector to classify the object. For example, the feature vector may include the values $\{B_{0max}, B_{1max}, \ldots, B_{nmax}\}$.

Radar system 202 is coupled to processor 211. Radar system 202 may provide the feature vector to processor 211 and the processor 211 may apply the feature vector to one of the machine learning models 205 that is trained to determine whether the object is a UAV or not a UAV. The one or more machine learning models 205 may be trained to label one or more objects. For example, a machine learning model may be trained to label an object as a "UAV" or "not a UAV." A machine learning model may be trained to label an object as a "bird" or "not a bird." A machine learning model may be trained to label an object as a "balloon" or "not a balloon."

The one or more machine learning models 205 may be configured to implement one or more machine learning algorithms (e.g., support vector machine, soft max classifier, autoencoders, naïve bayes, logistic regression, decision trees, random forest, neural network, deep learning, nearest neighbor, etc.). The one or more machine learning models 205 may be trained using a set of training data. The set of training data includes a set of positive examples and a set of negative examples. For example, the set of positive examples may include a plurality of feature vectors that indicate the detected object is a UAV. The set of negative examples may include a plurality of feature vectors that indicate the detected object is not a UAV. For example, the set of negative examples may include feature vectors associated with a balloon, bird, plane, helicopter, etc.

In some embodiments, the output of a machine learning model trained to identify UAVs may be provided to one or more other machine learning models that are trained to identify specific UAV models. The velocity profile of a UAV may follow a general micro-Doppler signature, but within the general micro-Doppler signature, different types of UAVs may be associated with different micro-Doppler signatures. For example, the offset difference between a bin corresponding to a baseline velocity and a bin corresponding to a secondary velocity may have a first value for a first UAV and a second value for a second UAV.

Processor 211 may provide the output from the one or more machine learning models 205 to interdiction system 207. Interdiction system 207 includes a capture net launcher 208, one or more sensors 209, and a control system 210. The control system 210 may be configured to monitor signals received from the one or more sensors 209 and/or radar system 202, and control the capture net launcher 208 to automatically deploy the capture net when predefined firing conditions are met. One of the predefined firing conditions may include an identification of a target UAV. One of the predefined firing conditions may include a threshold range between the target UAV and UAV 200. The one or more sensors 209 may include a global positioning system, a light detection and ranging (LIDAR) system, a sounded navigation and ranging (SONAR) system, an image detection system (e.g., photo capture, video capture, UV capture, IR capture, etc.), sound detectors, one or more rangefinders, etc. For example, eight LIDAR or RADAR beams may be used in the rangefinder to detect proximity to the target UAV. The one or more sensors 209 may include image capture sensors which may be controlled by the interdiction control system 210 to capture images of the object when detected by the range finding sensors. Based on the captured image and the range readings from the ranging sensors, the interdiction system may identify whether or not the object is the target UAV that is identified by radar system 202.

When the interdiction control system 210 determines that the object is a target UAV, it may also determine if the target UAV is in optimal capture position relative to the defending UAV. If the relative position between the target UAV and the defending UAV is not optimal, interdiction control system 210 may provide a recommendation or indication to the remote controller of the UAV. Interdiction control system 210 may provide or suggest course corrections directly to the processor 211 to maneuver the UAV into an ideal interception position autonomously or semi-autonomously. Once the ideal relative position between the target UAV and the defending UAV is achieved, interdiction control system 210 may automatically trigger capture net launcher 208. Once triggered, capture net launcher 208 may fire a net designed to ensnare the target UAV and disable its further flight.

The net fired by the capture net launcher may include a tether connected to UAV 200 to allow UAV 200 to move the target UAV to a safe area for further investigation and/or neutralization. The tether may be connected to the defending UAV by a retractable servo controlled by the control system 210 such that the tether may be released based on a control signal from the control system 210. Control system 210 may be configured to sense the weight, mass, or inertia effect of a target UAV being tethered in the capture net and recommend action to prevent the tethered target UAV from causing UAV 200 to crash or lose maneuverability. For example, control system 210 may recommend UAV 200 to land, release the tether, or increase thrust. Control system 210 may provide a control signal to the UAV control system (e.g., processor 211) to allow the UAV to autonomously or semi-autonomously take corrective actions, such as initiating an autonomous or semi-autonomous landing, increasing thrust to maintain altitude, or releasing the tether to jettison the target UAV in order to prevent the defending UAV from crashing.

Unmanned Aerial Vehicle 200 may include a camera system 212. Camera system 212 may be used to visually detect a UAV. Camera system 212 may visually detect an object and provide visual data (e.g., pixel data) to one of the one or more machine learning models 205. A machine learning model may be trained to label an object as "a UAV" or "not a UAV" based on the visual data. For example, a set of positive examples (e.g., images of UAVs) and a set of negative examples (e.g., images of other objects) may be used to train the machine learning model. Processor 211 may use the output from the machine learning model trained to label an object as a UAV based on the radar data and/or visual data to determine whether to activate the interdiction system 207. Processor 211 may activate interdiction system 207 in the event the machine learning model trained to label an object as a UAV based on radar data and the machine learning model trained to label the object as a UAV based on visual data indicate that the object is a UAV.

UAV 200 may use radar system 202 to detect an object that is greater than a threshold distance away. UAV 200 may use camera system 212 to detect an object that is less than or equal to the threshold distance away. UAV 200 may use both radar system 202 and camera system 212 to confirm that a detected object is actually a UAV. This reduces the number of false positives and ensures that the capture active mechanism is activated for actual UAVs.

Figure 3A:
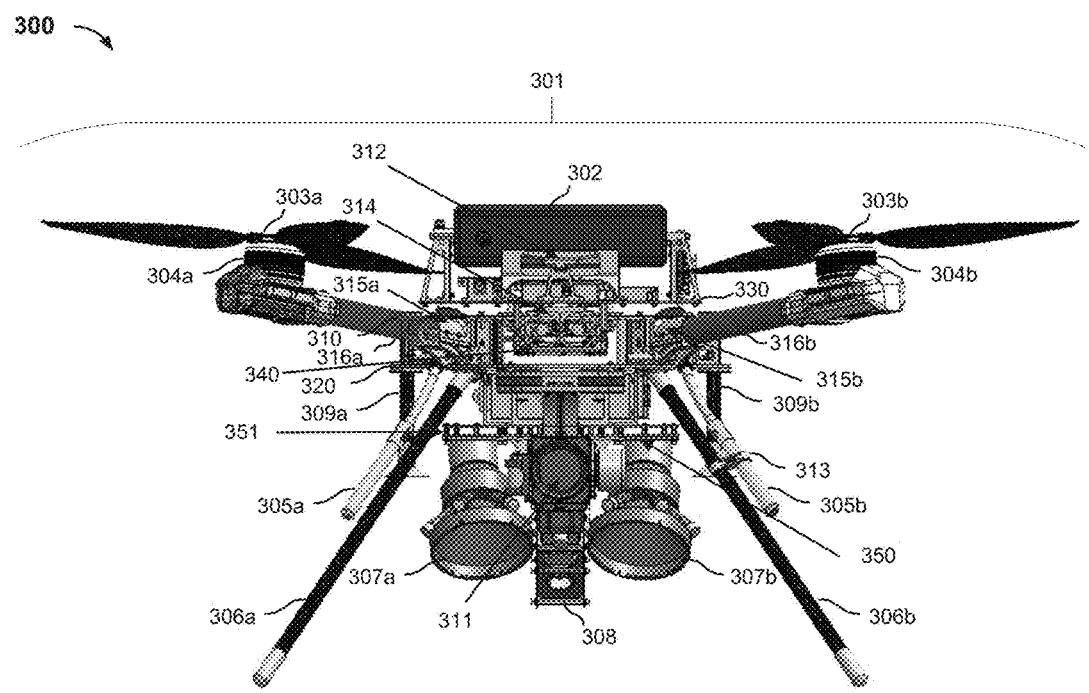
FIG. 3A is a diagram illustrating a front view of a UAV in accordance with some embodiments.

FIG. 3A is a diagram illustrating a front view of a UAV in accordance with some embodiments. Unmanned aerial vehicle 301 is an example of UAV 200 of FIG. 2 and/or aerial vehicle 102 of FIG. 1

In the example shown, front view 300 includes unmanned aerial vehicle 301 comprising computing chassis 302, first rotor 303a, second rotor 303b, first motor 304a, second motor 304b, first antenna 305a, second antenna 305b, first landing strut 306a, second landing strut 306b, first net launcher 307a, second net launcher 307b, first guide collar 309a, second guide collar 309b, interdiction sensor module 308, first structural isolation plate 310, visual detection system 311, disruption signal antenna 312, antenna clip 313, one or more cooling fans 314, first rotor arm bracket 315a, second rotor arm bracket 315b, first rotor arm 316a, second rotor arm 316b, second structural isolation plate 320, vibration isolation plate 330, vibration isolation plate 340, vibration isolation plate 350, and dampers 351.

Computing chassis 302 is configured to protect the CPU of UAV 301. The CPU is configured to control the overall operation of UAV 301. The CPU may be coupled to a plurality of computing modules. For example, the plurality of computing modules may include an interdiction control module, an image processing module, a safety module, a flight recorder module, etc. The CPU may provide one or more control signals to each of the plurality of computing modules. For example, the CPU may provide a control signal to the interdiction control module to activate one of the net launchers 307a, 307b to deploy a net. The CPU may provide a control signal to the image processing module to process an image captured by the visual detection system 311. The CPU may be configured to perform one or more flight decisions for the UAV. For example, the CPU may provide one or more flight commands to a flight controller module. For example, a flight command may include a specified speed for the UAV, a specified flight height for the UAV, a particular flight path for the UAV, etc. In response to the one or more flight commands, the flight controller module is configured to control the motors associated with the UAV (e.g., motors 304a, 304b) so that UAV 301 flies in a manner that is consistent with the flight commands. In some embodiments, the CPU is configured to receive flight instructions from a remote command center. In other embodiments, the CPU is configured to autonomously fly UAV 301.

The image processing module is configured to process images acquired by visual detection system 311. The image processing module may be configured to determine whether a visually detected object is a UAV based on the visual data associated with the detected object. The image processing module may include a plurality of machine learning models that are trained to label a detected object based on the visual data. For example, the image processing module may include a first machine learning model that is configured to label objects as a UAV, a second machine learning model that is configured to label objects as a bird, a third machine learning model that is configured to label objects as a plane, etc.

First structural isolation plate 310 is configured to isolate computing chassis 302 and its associated computing components from one or more noisy components. First structural isolation plate 310 is also configured to isolate the one or more noisy components from the electromagnetic interference noise associated with the computing components of computing chassis 302. The one or more noisy components isolated from computing chassis 302 and its associated computing components by first structural isolation plate 310 may include a communications radio (not shown in the front view) and a communications disruption signal generator (not shown in the front view).

First structural isolation plate 310 may include a foil made from a particular metallic material (e.g., copper) and the foil may have a particular thickness (e.g., 0.1 mm). First structural isolation plate 310 and second structural isolation plate 320 may act as a structural frame for UAV 301. First structural isolation plate 310 may be coupled to second structural isolation plate 320 via a plurality of rotor arm brackets (e.g., rotor arm brackets 315a, 315b) and a plurality of side wall components (not shown in the front view). The rotor arm brackets are coupled to a corresponding rotor arm. The first structural isolation plate 310 may be attached to one or more rotor arm clips (not shown in the front view). The one or more rotor arm clips are configured to lock and unlock corresponding rotor arms of UAV 301. The one or more rotor arm clips are configured to lock the rotor arms in a flight position when UAV 301 is flying. The one or more rotor arm clips are configured to unlock the rotor arms from a flight position when UAV 301 is not flying. For example, the rotor arms may be unlocked from the rotor arm clips when UAV 301 is being stored or transported to different locations.

First structural isolation plate 310 is coupled to vibration isolation plate 330 via a plurality of vibration dampers. First structural isolation plate 310 may be coupled to one or more dampers configured to reduce the amount of vibration to which a plurality of vibration sensitive components are subjected. The plurality of vibration sensitive components may include the computing modules included in computing chassis 302, connectors, and heat sinks. The performance of the vibration sensitive components may degrade when subjected to vibrations. The one or more dampers may be omnidirectional dampers. The one or more dampers may be tuned to the specific frequency associated with a vibration source. The vibrations may be mechanical vibrations caused by the motors of the UAV (e.g., motors 304a, 304b) and the rotors of the UAV (e.g., rotors 303a, 303b). First structural isolation plate 310 in combination with vibration isolation plate 330 and the plurality of dampers are configured to shield the plurality of computing components from vibrations, noise, and EMI.

Vibration isolation plate 330 is coupled to antenna 312 associated with a communications disruption signal generator. Antenna 312 may be a highly directional antenna (e.g., log periodic, parabolic, helical, yagi, phased array, horn, etc.) that is configured to transmit a communications disruption signal. The communications disruption signal may have a frequency associated with one or more wireless communications devices that the communications disruption signal is attempting to disrupt. For example, the communications disruption signal may have a frequency between 2.1 GHz and 5.8 GHz.

UAV 301 includes second structural isolation plate 320. A UAV may also be designed to include an isolation plate to isolate the noisy components from the radiating components and vice versa. Second structural isolation plate 320 is configured to isolate the one or more noisy components from one or more antennas and one or more sensors and vice versa. Second structural isolation plate 320 is also configured to act as a ground plane for the one or more antennas associated with a radio communications system of UAV 301.

Structural isolation plate 320 may also be coupled to one or more dampers to reduce an amount of vibration to which the noisy components are subjected. The combination of structural isolation plate 310 and structural isolation plate 320 acts as a Faraday cage for the noisy components. The combination of structural isolation plate 310 and structural isolation plate 320 is configured to isolate one or more high noise generating components of the UAV from the other components of the UAV. For example, a radio communications system and a communication disruption signal generator may be isolated from a plurality of computing components and a plurality of antennas. As a result, the influence that vibrations, noise, and EMI have on the overall performance of the UAV is reduced. One or more cooling fans 314 are coupled to and may be positioned in between vibration isolation plate 330 and vibration isolation plate 340. The high noise generating components of the UAV may generate a lot of heat during operation. One or more cooling fans 314 are configured to direct air towards the high noise generating components such that a temperature of the high noise generating components of the UAV is reduced during operation. A portion of the one or more cooling fans 314 may be placed adjacent to one of the openings of the structural frame comprising first structural isolation plate 310 and second structural isolation plate 320.

First rotor arm bracket 315a is coupled to first rotor arm 316a and second rotor arm bracket 315b is coupled to second rotor arm 316b. First rotor arm 316a is coupled to motor 304a and rotor 303a. Second rotor arm 316b is coupled to motor 304b and rotor 303b. Rotor arm brackets 315a, 315b are configured to engage rotor arms 316a, 316b, respectively. UAV 301 may lift off from a launch location and fly when rotor arms 316a, 316b are engaged with their corresponding rotor arm brackets 315a, 315b. When rotor arms 316a, 316b are engaged with their corresponding rotor arm brackets 315a, 315b, motors 304a, 304b may provide a control signal to rotors 303a, 303b to rotate.

A radio communications system of UAV 301 may be associated with a plurality of antennas (e.g., antenna 305a, antenna 305b). Each antenna may operate at a different frequency. This enables the radio communications system to switch between frequency channels to communicate. The radio communications system may communicate with a remote server via antenna 305a. For example, the radio communications system may transmit the data associated with the one or more sensors associated with UAV 301 (e.g., radar data, lidar data, sonar data, image data, etc.). The frequency channel associated with antenna 305a may become noisy. In response to the frequency channel associated with antenna 305a becoming noisy, the radio communications system may switch to a frequency channel associated with antenna 305b. The antennas associated with the radio communications system may be daisy chained together. The persistent systems radio may communicate with one or more other UAVs and transmit via antennas 305a, 305b a signal back to a source through the one or more other UAVs. For example, another UAV may act as an intermediary between UAV 301 and a remote server. UAV 301 may be out of range from the remote server to communicate using antennas 305a, 305b, but another UAV may be in range to communicate with UAV 301 and in range to communicate with the remote sever. UAV 301 may transmit the data associated with one or more sensors to the other UAV, which may forward the data associated with one or more sensors to the remote server.

The radio communications system of UAV 301 may be associated with three antennas (e.g., antenna 305a, antenna 305b, antenna 305c). The antennas may be approximately 90 degrees apart from each other (e.g., 90°±5°). The antennas may be coupled to the landing struts of UAV 301 (e.g., landing strut 306a, landing strut 306b, landing strut 306c) via an antenna clip, such as antenna clip 313. This allows the antennas to have a tripod configuration, which allows the antennas to have enough fidelity to transmit the needed bandwidth of data. For example, the tripod configuration allows the antennas to have sufficient bandwidth to transmit video data or any other data obtained from the one or more sensors of UAV 301.

UAV 301 may include a fourth antenna (not shown) that is also coupled to one of the landing struts of UAV 301. UAV 301 may be remotely controlled and the fourth antenna may be used for remote control communications. In some embodiments, the antennas coupled to the landing struts of UAV 301 may be integrated into the landing strut, such that an antenna is embedded within a landing strut.

UAV 301 may include guide collars 309a, 309b. Guide collars 309a, 309b may be coupled to a plurality of launch rails. UAV 301 may be stored in a hangar that includes the plurality of launch rails. Guide collars 309a, 309b are hollow and may be configured to slide along the launch rails to constrain lateral movement of UAV 301 until it has exited the housing or hangar.

UAV 301 may include a vibration isolation plate 350 that is coupled to a battery cage via a plurality of dampers 351. The vibration plate 350 may be coupled to net launchers 307a, 307b and interdiction sensor system 308. Interdiction sensor system 308 may include at least one of a global positioning system, a radio detection and ranging (RADAR) system, a light detection and ranging (LIDAR) system, a sounded navigation and ranging (SONAR) system, an image detection system (e.g., photo capture, video capture, UV capture, IR capture, etc.), sound detectors, one or more rangefinders, etc. For example, eight LIDAR or RADAR beams may be used in the rangefinder to detect proximity to the target UAV. Interdiction sensor system 308 may include one or more LEDs that indicate to bystanders whether UAV 301 is armed and/or has detected a target. The one or more LEDs may be facing away from the back of UAV 301 and below UAV 301. This enables one or more bystanders under UAV 301 to become aware of a status associated with UAV 301.

Interdiction sensor system 308 may include image capture sensors which may be controlled by the interdiction control module to capture images of the object when detected by the range finding sensors. Based on the captured image and the range readings from the ranging sensors, the interdiction control module may identify whether or not the object is a UAV and whether the UAV is a UAV detected by one of the sensor systems.

When the interdiction control module determines that the object is a target UAV, it may also determine if the target UAV is in optimal capture position relative to the defending UAV. The position between UAV 301 and the target UAV may be determined based on one or more measurements performed by interdiction sensor system 308. If the relative position between the target UAV and the defending UAV is not optimal, the interdiction control module may provide a recommendation or indication to the remote controller of the UAV. An interdiction control module may provide or suggest course corrections directly to the flight controller module to maneuver UAV 301 into an ideal interception position autonomously or semi-autonomously. Once the ideal relative position between the target UAV and the defending UAV is achieved, the interdiction control module may automatically trigger one of the net launchers 307a, 307b. Once triggered, one of the net launchers 307a, 307b may fire a net designed to ensnare the target UAV and disable its further flight.

The net fired by the capture net launcher may include a tether connected to UAV 301 to allow UAV 301 to move the target UAV to a safe area for further investigation and/or neutralization. The tether may be connected to the defending UAV by a retractable servo controlled by the interdiction control module such that the tether may be released based on a control signal from the interdiction control module. The CPU of the UAV may be configured to sense the weight, mass, or inertia effect of a target UAV being tethered in the capture net and recommend action to prevent the tethered target UAV from causing UAV 301 to crash or lose maneuverability. For example, the CPU may recommend UAV 301 to land, release the tether, or increase thrust. The CPU may provide a control signal to allow the UAV to autonomously or semi-autonomously take corrective actions, such as initiating an autonomous or semi-autonomous landing, increasing thrust to maintain altitude, or releasing the tether to jettison the target UAV in order to prevent the defending UAV from crashing.

UAV 301 may include visual detection system 311. Visual detection system 311 may include one or more cameras. Visual detection system 311 may be used by a remote operator to control a flight path associated with UAV 301. Visual detection system 311 may provide visual data to an image processing module configured to visually detect an object and provide visual data (e.g., pixel data) to one or more machine learning models. The one or more machine learning models may be trained to label an object as a UAV based on the visual data. The image processing module may provide an output indicating that an object is labeled as a UAV to the interdiction control module. The interdiction control module may be configured to activate net launchers 307a, 307b based on the label. For example, in the event the visually detected object is labeled a UAV and the visually detected object is within a threshold range from UAV 301, the interdiction control module may output a control signal that causes one of the net launchers 307a, 307b to deploy a net.

Figure 3B:
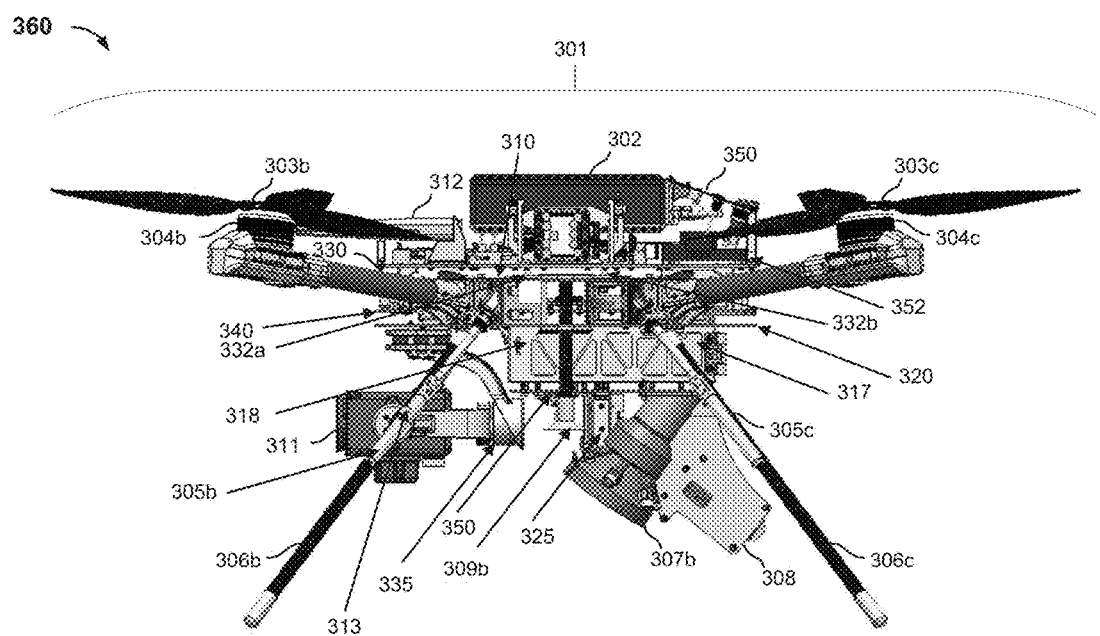
FIG. 3B is a diagram illustrating a side view of a UAV in accordance with some embodiments. In some embodiments, unmanned aerial vehicle 301 may be used to implement a UAV, such as UAV 100.

FIG. 3B is a diagram illustrating a side view of a UAV in accordance with some embodiments. In some embodiments, unmanned aerial vehicle 301 may be used to implement a UAV, such as UAV 100.

In the example shown, side view 360 includes unmanned aerial vehicle 301 comprising computing chassis 302, UI panel 350, flight controller module 352, second rotor 303b, third rotor 303c, second motor 304b, third motor 304c, second antenna 305b, third antenna 305c, second landing strut 306b, third landing strut 306c, battery 317, battery cage 318, second net launcher 307b, interdiction sensor module 308, second guide collar 309b, first structural isolation plate 310, visual detection system 311, disruption signal antenna 312, antenna clip 313, second structural isolation plate 320, gimbal 335, tether mechanism 325, vibration dampers 332a, 332b, vibration isolation plate 340, and vibration isolation plate 350.

UI panel 350 is coupled to a safety module that is included in computing chassis 302. UI panel 350 comprises one or more switches, knobs, buttons that enable an operator to arm and disarm UAV 301. An operator may interact with UI panel 350 and based on the operator interactions, the safety module is configured to arm/disarm UAV 301. For example, first net launcher 307a and second net launcher 307b may be disarmed based on one or more interactions of an operator with UI panel 350. This may allow the operator to inspect and/or perform maintenance on UAV 301.

Flight controller module 352 is configured to control a flight of UAV 301. The flight controller module may provide one or more control signals to the one or more motors (e.g., 304a, 304b) associated with UAV 301. The one or more control signals may cause a motor to increase or decrease its associated revolutions per minute (RPM). UAV 301 may be remotely controlled from a remote location. UAV 301 may include an antenna that receives flight control signals from the remote location. In response to receiving the flight control signals, the CPU of UAV 301 may determine how UAV 301 should fly and provide control signals to flight controller module 352. In response to the control signals, flight controller module 352 is configured to provide control signals to the one or more motors associated with UAV 301, causing UAV 301 to maneuver as desired by an operator at the remote location.

Antenna 305c is coupled to landing strut 306c. Antenna 305c is one of the antennas associated with a communications radio system of UAV 301. Antenna 305c is configured to operate at a frequency that is different than antennas 305a, 305b. A communications radio system may be configured to switch between frequency channels to communicate. The communications radio system may communicate with a remote server via antenna 305a. The frequency channel associated with antenna 305a may become noisy. For example, the radio communications system may transmit the data associated with the one or more sensors associated with UAV 301 (e.g., radar data, LIDAR data, sonar data, image data, etc.). In response to the frequency channel associated with antenna 305a becoming noisy, the radio communications system may switch to a frequency channel associated with antenna 305b. The frequency channel associated with antenna 305b may become noisy. In response to the frequency channel associated with antenna 305b becoming noisy, the radio communications system may switch to a frequency channel associated with antenna 305c.

Battery 317 is configured to provide power to UAV 301. UAV 301 is comprised of a plurality of components that require electricity to operate. Battery 317 is configured to provide power to the plurality of components. In some embodiments, battery 317 is a rechargeable battery. Battery 317 is housed within battery cage 318. Battery cage 318 may be coupled to vibration isolation plate 350 via a plurality of dampers. Vibration isolation plate 350 may be coupled to interdiction sensor module 308, net launchers 307a, 307b, tether mechanism 325, and a persistent availability plug.

Gimbal 335 is coupled to visual detection system 311 and second structural isolation plate 320. A gimbal is a pivoted support that allows the rotation of visual detection system 311 about a single axis. Gimbal 335 is configured to stabilize an image captured by visual detection system 311.

Tether mechanism 325 is coupled to net capture launchers 307a, 307b. When a net is deployed by one of the net capture launchers 307a, 307b, the net remains tethered to UAV 301 via tether mechanism 325. Tether mechanism 325 may be configured to sense the weight, mass, or inertia effect of a target UAV being tethered in the capture net. In response to the sensed signals, a CPU of UAV 301 may be configured to recommend action to prevent the tethered target UAV from causing UAV 301 to crash or lose maneuverability. For example, the CPU of UAV 301 may recommend UAV 301 to land, release the tether, or increase thrust. The CPU of UAV 301 may provide a control signal to allow the UAV to autonomously or semi-autonomously take corrective actions, such as initiating an autonomous or semi-autonomous landing, increasing thrust to maintain altitude, or releasing the tether to jettison the target UAV in order to prevent the defending UAV from crashing.

Vibration dampers 332a, 332b are coupled to structural isolation plate 310 and vibration isolation plate 330. Vibration dampers 332a, 332b may be omnidirectional dampers. Vibration dampers 332a, 332b may be configured to reduce the amount of vibration to which a plurality of vibration sensitive components are subjected. The plurality of vibration sensitive components may include different electronics modules (e.g., components included in computing chassis 302, connectors, and heat sinks). The performance of the vibration sensitive components may degrade when subjected to vibrations. Vibration dampers 332a, 332b may be tuned to the specific frequency associated with a vibration source. The vibrations may be mechanical vibrations caused by the motors of the UAV (e.g., motors 304a, 304b) and the rotors of the UAV (e.g., rotors 303a, 303b). Vibration dampers 332a, 332b may be tuned to the mechanical vibrations caused by the motors of the UAV and the rotors of the UAV. Vibration dampers 332a, 332b may be comprised of a vibration damping material, such as carbon fiber. In some embodiments, one or more vibration dampers may be included in between a motor and a motor mount.

Figure 4:
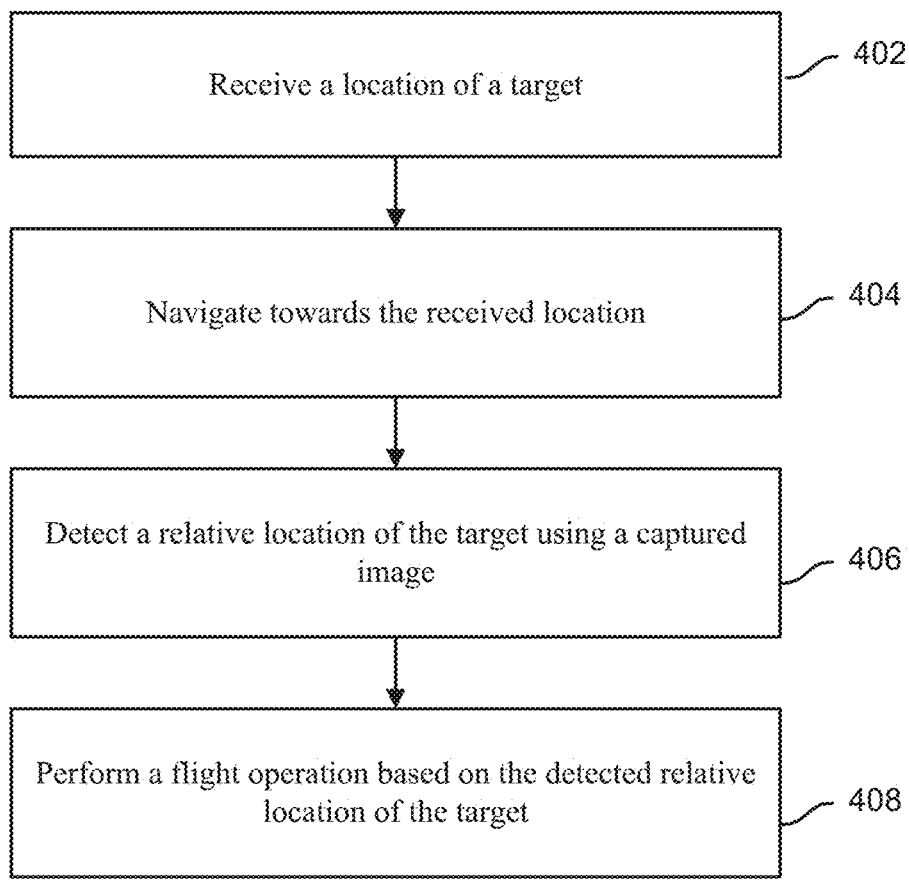
FIG. 4 is a flowchart illustrating an embodiment of a process for automatically controlling flight of a vehicle.

FIG. 4 is a flowchart illustrating an embodiment of a process for automatically controlling flight of a vehicle. In some embodiments, the process of FIG. 4 is performed by interceptor aerial vehicle 102 of FIG. 1, UAV 200 of FIG. 2, and/or UAV 301 of FIGS. 3A and 3B.

At 402, a location of a target is received. An example of the location is geographical location coordinate and an example of the target is a vehicle detected to be not allowed in a monitored airspace (e.g., target aerial vehicle 110 of FIG. 1). In some embodiments, the location is a geographical location coordinate that has been determined using one or more remote sensors. For example, the location of target aerial vehicle 110 is provided by ground station 104 via a wireless communication to interceptor aerial vehicle 102, and ground station 104 has determined the location based on information from sensors of ground station 104 and/or ground-based sensor 106 of FIG. 1. In some embodiments, the location is received directly from one or more different sensors (e.g., from one or more ground-based sensors). In some embodiments, the location is relative to a reference aerial vehicle. For example, the location (e.g., including azimuth angle, altitude angle, distance) is determined using an on-vehicle sensor (e.g., radar sensor of UAV 301).

In some embodiments, the received location has been filtered (received as filtered) and/or is filtered (e.g., filtered using a processor on an aerial vehicle) based on one or more sensor measurements. For example, once a likely geographical location has been determined for the target, the location is filtered using a Kalman filter (e.g., linear Kalman filter) to reduce noise and inaccuracies. The filter may take into account a model of a target vehicle and its movement/flight properties and capabilities to determine the location based on a series of sensor measures over time. The location of the target may be updated and continually received as a new or updated location of the target is determined. For example, the received location is a part of a stream of locations tracked for the target.

At 404, the received location is utilized to navigate towards the received location. For example, the location is received at a navigation component and/or a flight controller of an interceptor aerial vehicle and the direction and/or speed of the aerial vehicle is automatically and autonomously adjusted to turn and fly towards the received location in a navigation mode based on the received location. This allows the interceptor aerial vehicle to be approached and become closer to the vicinity of the target. However, because the received location may represent a rough and/or approximate location of the target, the received location may not represent the exact location of a moving target required to be known to successfully deploy an interdiction/capture mechanism.

At 406, a relative location of the target is detected using a captured image. For example, once an image sensor/camera on a reference system (e.g., interceptor aerial vehicle 102 of FIG. 1) is within range to acquire an image of the target, the reference system is able to more accurately detect and automatically navigate to the location of the target based at least in part on the image sensor/camera data. In some embodiments, once the reference system is within a predetermined distance (e.g., 20 meters) from the received location and the image sensor/camera is pointing towards the direction of the received location, captured images are analyzed using a processor of the reference system in an attempt to detect the target aerial vehicle in the image using computer machine vision. If the target aerial vehicle is not detected in the captured image, the reference system continues to proceed towards the received location in the received location-based navigation mode. However, once the target is detected in a captured image, the navigation of the reference system may now be performed based on the image rather than or in addition to the received location. If the image of the target is lost, the reference system may fall back to the previous received location-based navigation until the target is detected again in a captured image. The detection of the target in the captured image may be performed using machine/computer vision. For example, using a machine learning model trained using training data of various different example targets, captured images of one or more image sensors are analyzed to identify a likely target in the image. In some embodiments, the relative location is specified by an azimuth angle and an altitude angle. A distance value to the target and/or desired speed/acceleration may also be specified for the relative location. In some embodiments, the relative location is specified by a three-dimensional vector determined based on the detected image of the target. For example, the three-dimensional vector is specified by values corresponding to three axial values.

At 408, a flight operation is performed based on the detected relative location of the target. For example, a flight direction and/or speed of an interceptor aerial vehicle are automatically and autonomously adjusted based on a location and size of the target within the captured image (e.g., adjust direction to center the target within subsequently captured images). This allows the flight path of the interceptor aerial vehicle to be dynamically adjusted to track and follow a moving target, allowing the interceptor aerial vehicle to come within a threshold distance where an interdiction/capture system (e.g., a net fired from the interceptor aerial vehicle) can be effectively deployed. In some embodiments, a scaled three-dimensional vector based on the relative location of the target and determined based on the detected image of the target is used to adjust a flight path of the interceptor aerial vehicle in the direction and intensity of the three-dimensional vector. For example, the three-dimensional vector specifies directional and speed/acceleration changes to be performed by the interceptor aerial vehicle to direct the flight path of the interceptor aerial vehicle at a desired rate of change towards the target aerial vehicle.

Although the examples were discussed with respect to aerial vehicles, in various other embodiments, the techniques discussed herein may be applied to other types of vehicles such as terrestrial and aquatic vehicles.

Figure 5:
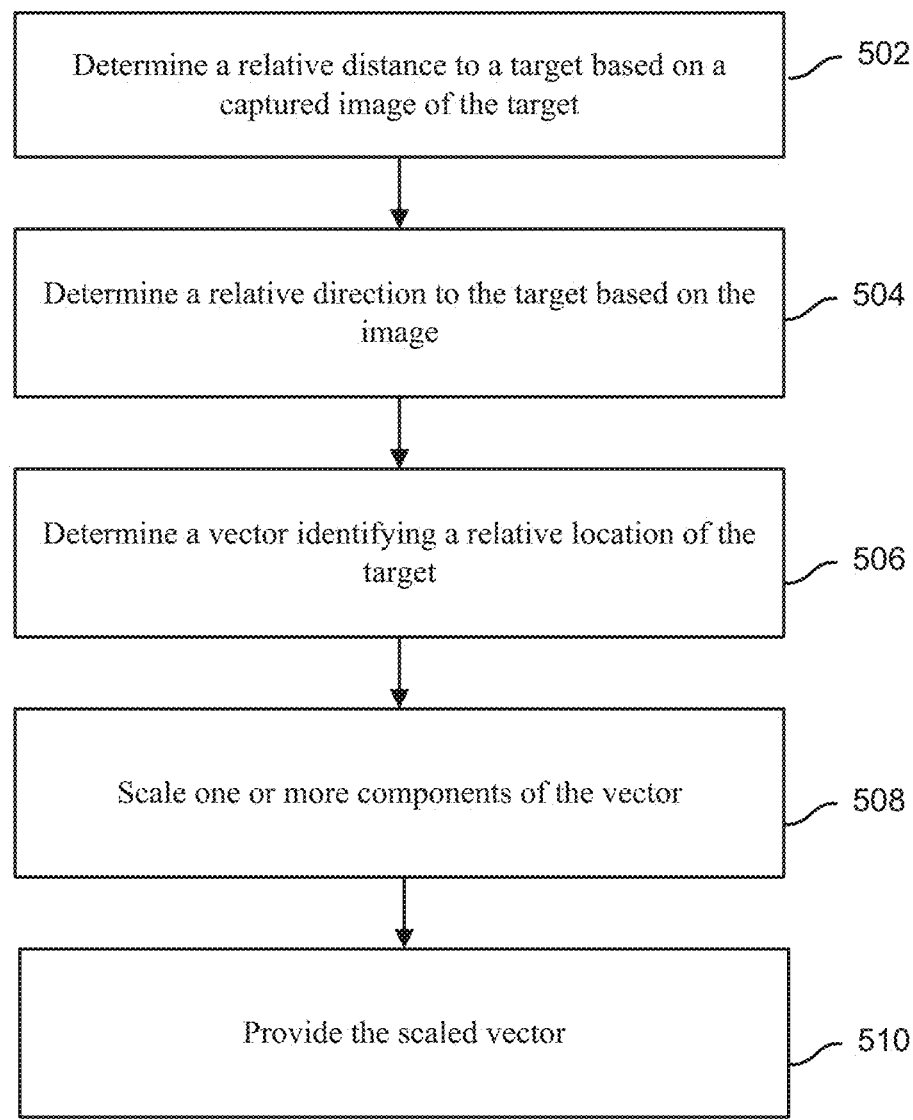
FIG. 5 is a flowchart illustrating an embodiment of a process for determining a vector associated with a target.

FIG. 5 is a flowchart illustrating an embodiment of a process for determining a vector associated with a target. In some embodiments, the process of FIG. 5 is performed by interceptor aerial vehicle 102 of FIG. 1, UAV 200 of FIG. 2, and/or UAV 301 of FIGS. 3A and 3B. In some embodiments, at least a portion of the process of FIG. 5 is performed in 406 and/or 408 of FIG. 4. The process of FIG. 5 may be repeated when a target aerial vehicle is detected in an image being continually captured by an interceptor aerial vehicle.

At 502, a relative distance to a target is determined based on a captured image of the target. In some embodiments, the image is acquired from a camera onboard an interceptor aerial vehicle (e.g., camera 212 of FIG. 2). For example, an image sensor/camera of the interceptor aerial vehicle continually captures a stream of images in one or more directions including in the direction of travel of the interceptor aerial vehicle and each captured image is analyzed to identify a target aerial vehicle in the image, if possible. The detection of the target in the captured image may be performed using machine/computer vision. For example, using a machine learning model trained using training data of various different images of targets, the captured image is analyzed to identify the target aerial vehicle in the image. The output of the image analysis (e.g., output from applying the machine learning model) may include a bounding box outlining an area within the image that includes the image portion with the target (e.g., bounding box outlines the minimum sized box that includes detected features of the target) and/or a classification of the detected target (e.g., type, model, class, manufacturer, size, etc. of the detected target).

In some embodiments, the relative distance to the target identifies the relative distance between a reference system (e.g., interceptor aerial vehicle) and the target (e.g., target aerial vehicle). The relative distance may be determined based on a size of the bounding box within the entire captured image and a detected classification of the target. For example, the target that is further away will appear smaller in the image as compared to the target that is closer to the reference location, and thus the size of the detected target within the image can be used as a proxy for the distance to the target. However, different types of target aerial vehicles may be different sizes and the actual physical size of the target needs to be taken into account when using the target size within the image as a proxy for relative distance. In some embodiments, the machine learning model has been trained using different examples of types of aerial vehicles (e.g., different models, types, manufacturers, sizes, etc.) to be able to classify and identify the specific type of the detected target aerial vehicle and a corresponding size profile corresponding to the specific type. If a specific type of the target cannot be reliably determined, a default size profile corresponding to a general type may be utilized. Thus, a measurement of the target within the image (e.g., width of the bounding box, length of the bounding box, diagonal length of the bounding box, area of the bounding box, number of pixels in the bounding box, number of pixels across a dimension of the bounding box, etc.) can be mapped to a distance value based on a determined size corresponding to the detected type/classification of the target. A table and/or formula for the mappings may be predetermined for different types/classifications. In some embodiments, the mapping to the distance value may also take into account one or more properties of the camera utilized to capture the image. For example, the sensor size, sensor pixel configuration, a zoom setting, and/or a field of view of the camera is utilized in adjusting or normalizing the distance value and/or the measurement of the target image portion within the overall image. In some embodiments, images from different cameras are utilized and analyzed together to determine the direction to the target.

At 504, a relative direction to the target is determined based on the image. Because the camera that captured the image is affixed to the reference aerial vehicle at a known location and orientation, the direction captured by each pixel of the camera sensor is known and can be predetermined. For example, based on the known height and width of the image sensor (e.g., number of pixels in height and width), optical properties of the camera lens (e.g., the field of view of the camera), and the capture direction/orientation of the camera with respect to the reference aerial vehicle, each location within the image (e.g., each pixel) can be mapped to a specific relative direction with respect to the reference aerial vehicle. For example, the output of the image analysis (e.g., output from applying the machine learning model) may include a bounding box identifying an area within the image that includes the target and the center of the bounding box can be used as a representative central point for the target. In other examples, another type of point on the target within the image may be selected as the representative point for the target (e.g., specifically identified point on a body of the target). The location (e.g., x and y location) of this representative point within the image is determined (e.g., pixel location). This two-dimensional location represents the relative direction of the target with respect to the reference as this two-dimensional location can be mapped to a corresponding azimuth angle and altitude angle. For a specific camera, image sensor, and capture direction/orientation, a table and/or formula for the mapping between the pixel/image location and corresponding azimuth angle and altitude angle may be predetermined. In some embodiments, images from different cameras are utilized and analyzed together to determine the relative direction of the target.

At 506, a vector identifying the relative location of the target is determined using at least the determined relative direction of the target. For example, determined angular directions (e.g., azimuth angle and altitude angle) can be mapped to a three-dimensional vector identified by three axial components (e.g., x-axis, y-axis, and z-axis values). In some embodiments, a predetermined relationship between the relative direction angles and the vector components are utilized to determine the vector. In some embodiments, the vector is at least in part defined using a distance and/or speed value. For example, the distance value determined in 502 is mapped to a desired speed of travel to reach the target (e.g., greater speed desired for further distance and slower speed desired for shorter distance to allow more time for direction correction) and the length of the vector is based on the determined distance and/or speed. In one example, the vector is defined by the azimuth angle, the altitude angle, and a factor based on an associated distance or speed. In some embodiments, the vector is defined by three-dimensional coordinate-based values and the vector is to be provided along with the associated distance and/or speed.

At 508, the vector is scaled. In some embodiments, scaling the vector includes modifying a speed and/or acceleration associated with the vector as well as smoothing and limiting the rate of change associated with the vector. In some embodiments, the scaling the vector includes modifying one or more directional component values of the vector.

Modifying the speed and/or acceleration associated with the vector includes adjusting a factor used to control the speed and/or acceleration of the interceptor aerial vehicle based on an amount of directional change specified by the vector. For example, when a large directional change is required by the interceptor aerial vehicle to fly towards the target, a slower speed is desirable to allow the directional change to take place at a slower speed over a shorter distance as compared to a faster speed that is desirable to reach the target quicker when no or minor directional change is required. In some embodiments, the speed and/or acceleration factor is multiplied by one or more scalar values that change in magnitude based on a directional deviation of the vector from a current direction of movement (e.g., deviation of the target in the image from the center of the image representing the current heading direction of the interceptor aerial vehicle). For example, plotting the scalar value with respect to a directional deviation results in a bell curve where the highest scalar value is associated with the center of the graph corresponding to no change in directional deviation (e.g., the directional deviation given by a component value of the vector) and the scalar value decreases exponentially on either side of the center as the directional deviation increases. In other examples, the scalar value may decrease linearly on either side of the center as the directional deviation increases. In some embodiments, the scalar value is a function of one or more of a plurality of directional axes of the vector. For example, the scalar value is a combination of one scalar value that varies based on a relationship (e.g., function) with one component value of the vector and another scalar value that varies based on a different relationship (e.g., a different function) with another component value of the vector. In some embodiments, the factor used to control the speed and/or acceleration of the interceptor aerial vehicle includes limiting its rate of change and/or value (e.g., either by a reduction scalar or a maximum change limit) so that the interceptor aerial vehicle does not change its speed in a manner that is too sudden or difficult to achieve given flight hardware limitations. For example, a magnitude of change of the speed and/or acceleration is allowed up to a predetermined maximum limit.

In some embodiments, the scaling the vector includes modifying one or more directional component values of the vector. For example, a rate of change and/or a value of one or more components of the vector is limited (e.g., either by a reduction scalar value or a limit) so that the interceptor aerial vehicle does not change directions in a manner that is too sudden or difficult to achieve given flight hardware limitations. In one example, a magnitude of change of a component value of the vector is limited by a predetermined maximum limit. In some embodiments, the one or more component values of the vector are multiplied by one or more scalar values that change in magnitude based on a deviation of the corresponding component value from a center reference value (e.g., corresponding to a current direction of movement). For example, plotting the scalar value with respect to a deviation results in a bell curve where the highest scalar value is associated with the center of the graph corresponding to no change in deviation from a reference and the scalar value decreases exponentially on either side of the center as the deviation increases. In other examples, the scalar value may decrease linearly on either side of the reference as the deviation increases. In some embodiments, the scalar value may be specified to a particular directional axis of the vector. For example, different scalar value functions correspond to different component values of the vector.

At 510, the scaled vector and one or more associated values are provided. For example, the scaled vector and associated directional values and distance, speed, and/or acceleration values are provided for use in navigating the interceptor aerial vehicle towards the target aerial vehicle. In some embodiments, the scaled vector and one or more associated values are provided for use in performing the flight operation in 408 of FIG. 4.

Figure 6:
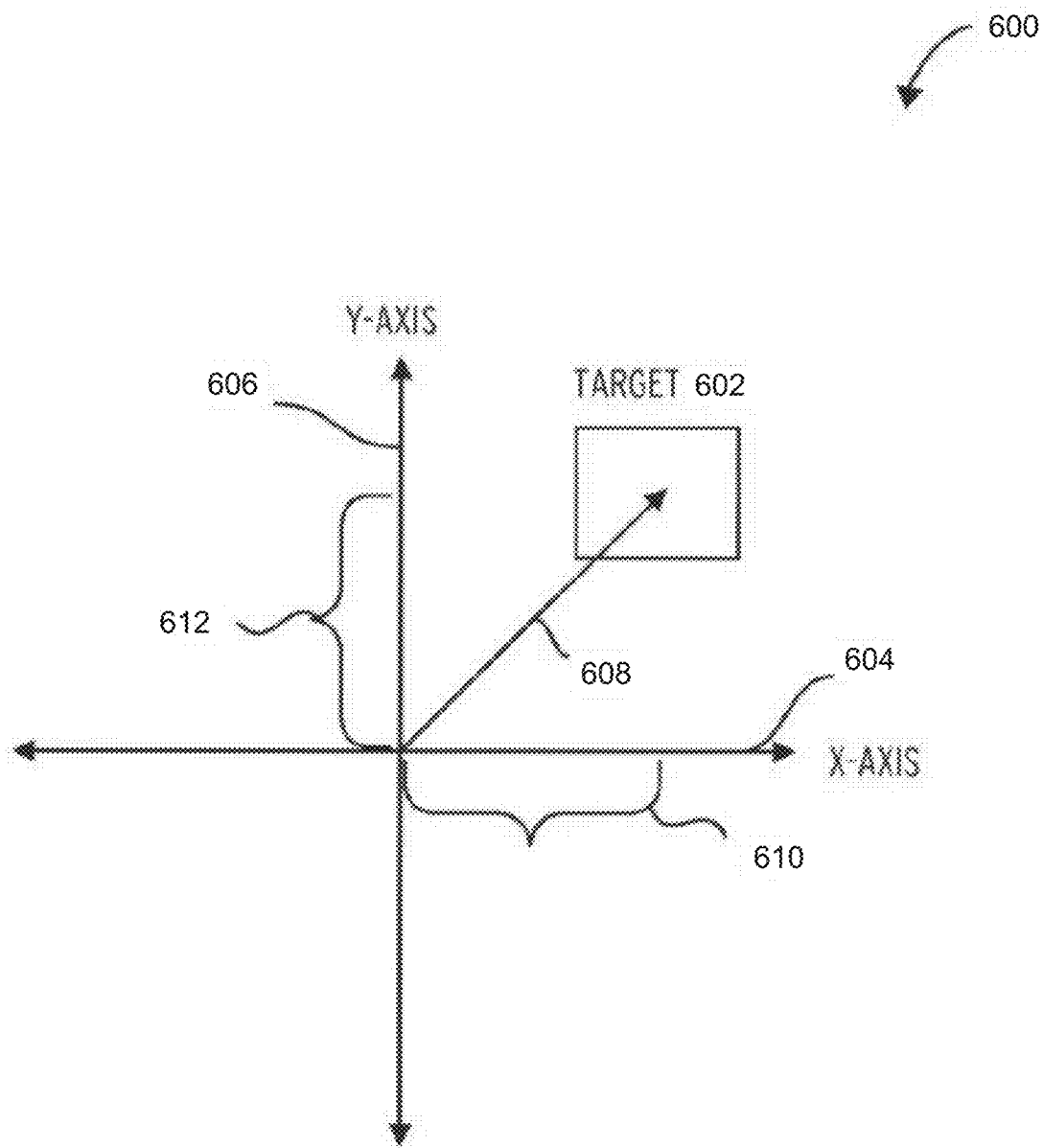
FIG. 6 is an illustration illustrating an example of a two dimensional vector determined using an image from a camera feed.

FIG. 6 is an illustration illustrating an example of a two dimensional vector determined using an image from a camera feed. Graph representation 600 shows target 602, an x-axis 604, y-axis 606, 2D vector 608, degX 610, and degY 612. The target 602 may comprise pixels associated with a target. The number of pixels associated with the target 602 may be utilized to determine the depth of the target 602 by comparing the number to the total number of pixels. The x-axis 604 may measure the number of degrees the target 602 is located left or right of the center of the camera feed (e.g., the degX 610). In some embodiments, the x-axis 604 measures from −21 degrees to 21 degrees. The y-axis 606 may measure the number of degrees the target 602 is located above or below the center of the camera feed (e.g., the degY 612). In some embodiments, the y-axis 606 measures from −35 degrees to 35 degrees. The 2D vector 608 is the combination of the degX 610 and the degY 612.

Figure 7:
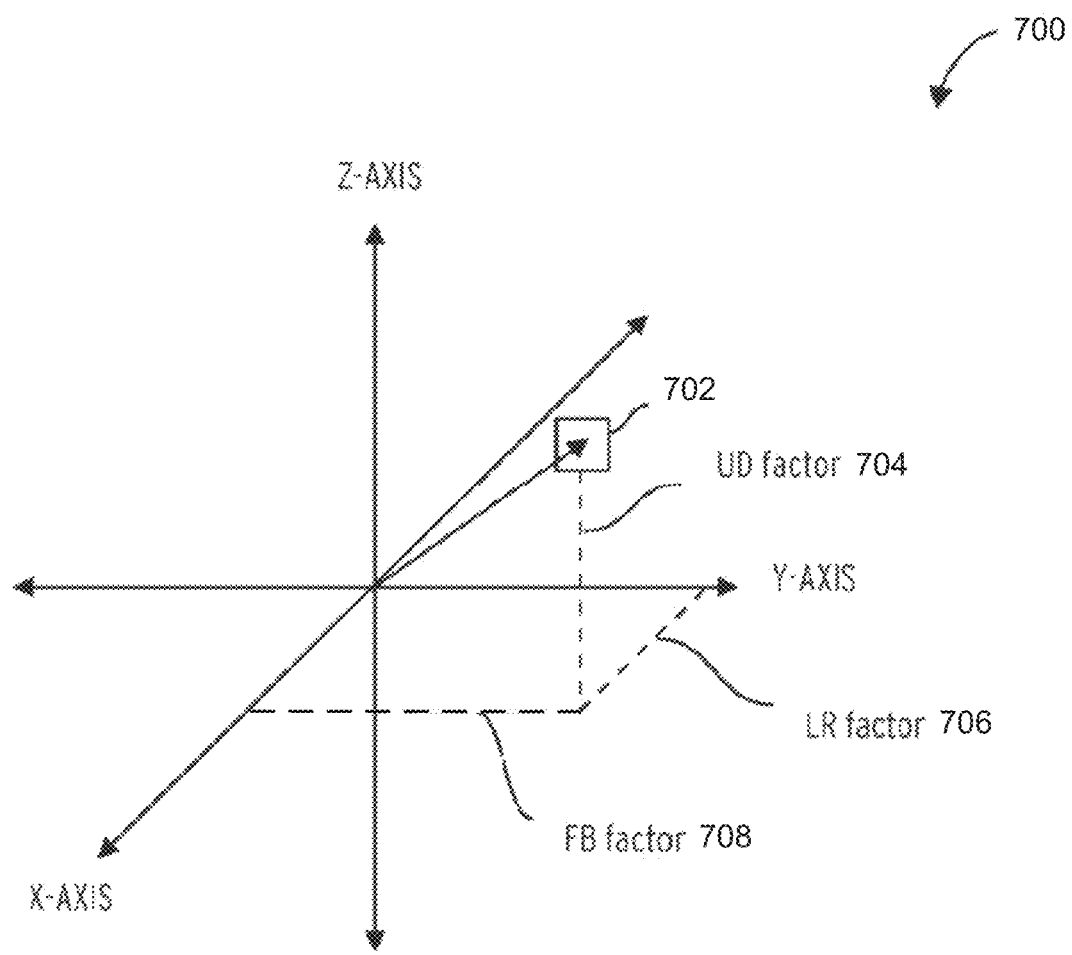
FIG. 7 is an illustration illustrating an example of a three dimensional vector determined using two dimensional measurements.

FIG. 7 is an illustration illustrating an example of a three dimensional vector determined using two dimensional measurements. 3D vector 700 comprises a target 702, a UD factor 704, an LR factor 706, and an FB factor 708. Target 702, which is associated with a 2D vector, has a 3D vector determined, which may comprise the UD factor 704, the LR factor 706, and the FB factor 708. The UD factor 704, the LR factor 706, and the FB factor 708 may be calculated using the example equations shown in FIG. 8.

FIG. 8 shows example equations that can be utilized to determine a three dimensional vector. The equations are based on measurements for two axes of an image, such as an x-axis (degX) and a y-axis (degY). An initial 2D vector may be determined based on the location of the target pixels. The 2D vector is then converted into a 3D vector comprising three factors: an up/down factor (UD), a front/back factor (FB), and a left/right factor (LR). The conversion may be performed utilizing the equations shown in FIG. 8. The vector comprising UD, FB, and LR, as well as associated speed value may be scaled and/or smoothed. In some embodiments, associated speed values are utilized to modify the initial vector components UD, FB, and LR. The speed may be utilized as a scalar multiplier, or the speed may affect the components of the 3D vector differently.

Figure 9:
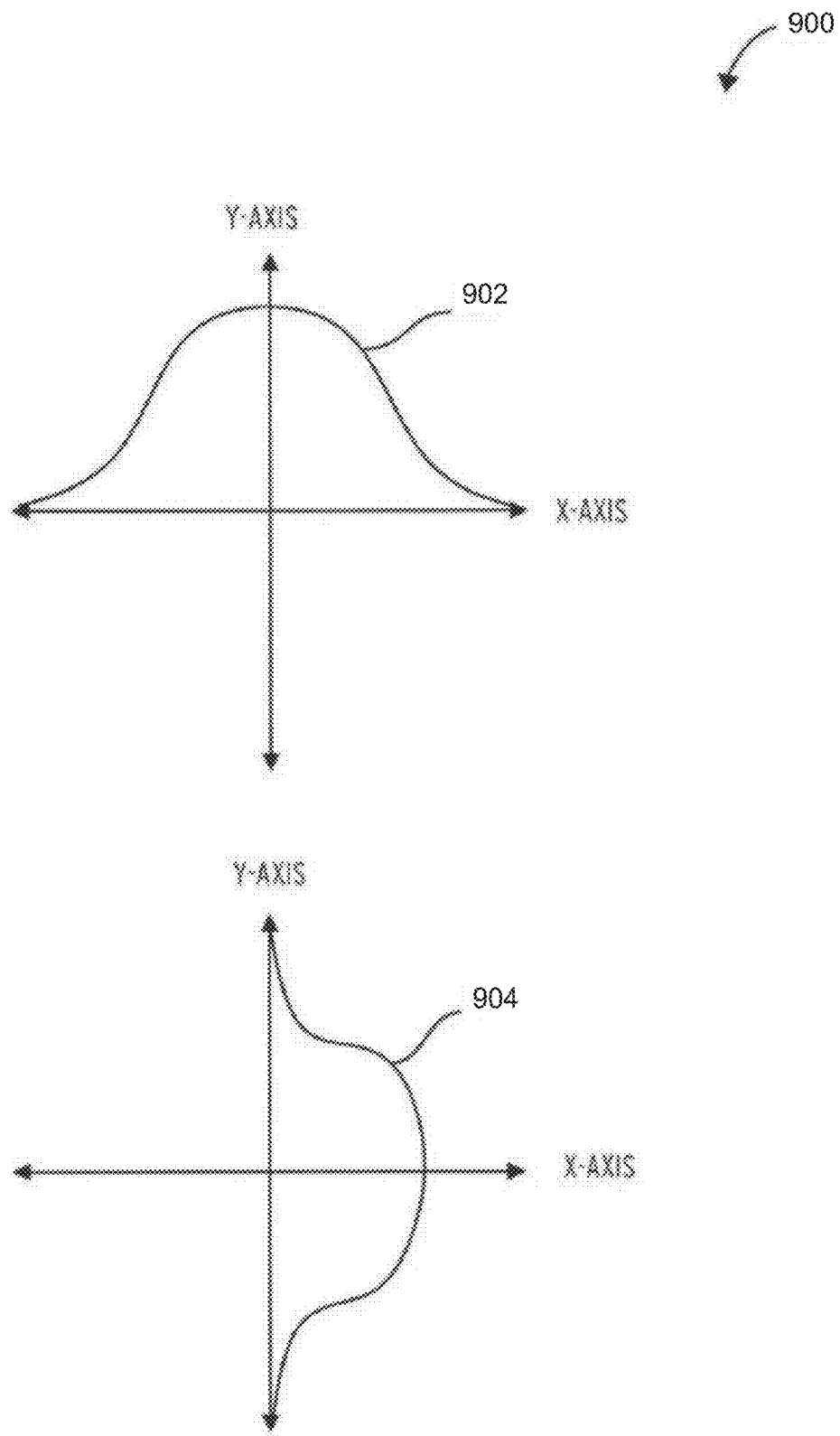
FIG. 9 is an illustration illustrating examples of functions utilized to adjust component values of a vector.

FIG. 9 is an illustration illustrating examples of functions utilized to adjust component values of a vector. Logic smoothing functions 900 comprises an x-axis logic smoothing function 902 and a y-axis logic smoothing function 904. The x-axis logic smoothing function 902 and the y-axis logic smoothing function 904 may depend on the x-axis and y-axis, respectively. The x-axis logic smoothing function 902 and the y-axis logic smoothing function 904 may be applied to vectors, such as 3D vector 700. The x-axis logic smoothing function 902 and y-axis logic smoothing function 904 may be applied to one or more of the components of the vectors. For example, the x-axis logic smoothing function 902 may be applied to the LR factor 706 and the FB factor 708, but not the UD factor 704. The y-axis logic smoothing function 904 may be applied similarly in this example.

FIG. 10 shows example equations that can utilized to scale/alter components values of a vector. For example, a logistical smoother alters the vector to stabilize the motion of a drone. The logistical smoother may utilize the axial measurements (e.g., degX and degY) to alter the vector. The logistical smoother 110 may also utilize predetermined constants to alter the vector. In one embodiment, UD is modified by a constant, and FB and LR are modified by a speed factor, which depends on both degX and degY, which may be converted to their absolute value prior to calculation, as shown in the equations of FIG. 10. The $ud_{factor}$ in Equation 4 may be a constant. Equations 7 and 8 may both be applied when determining the speed factor for Equations 5 and 6. In other embodiments, each vector component may utilize a specific component of speed factor (e.g., either Equation 7 or Equation 8). The constants a, b, and c depicted in Equations 7 and 8 may be the same value or they may be different values. That is, each constant for speed factor with respect to degX may be different, and the constant may differ based on whether applied to the speed factor for degX or degY. The final 3D vector can be utilized to perform a flight operation.

Figure 11:
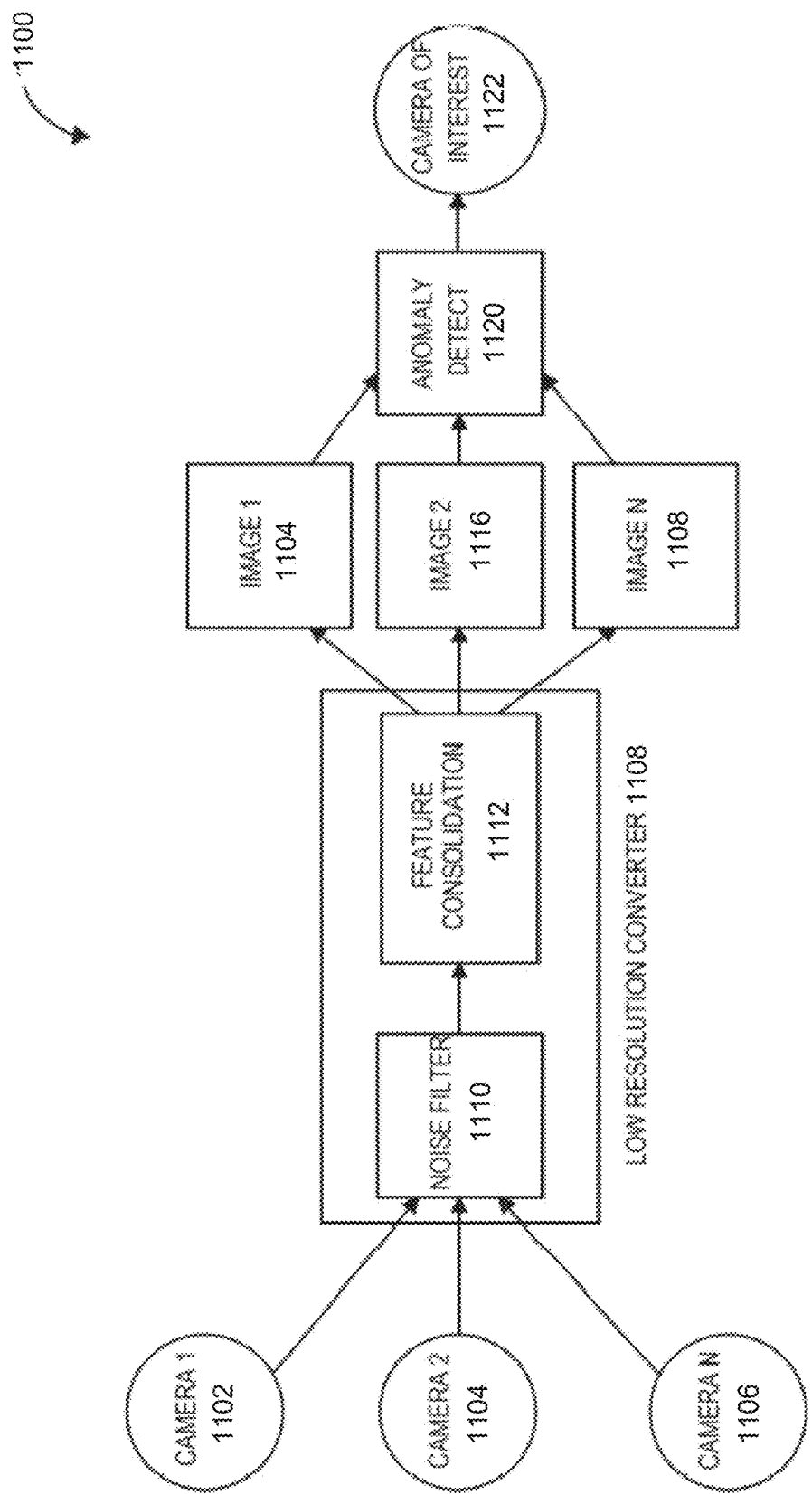
FIG. 11 illustrates an embodiment of a spacio-temporal awareness engine 1100.

FIG. 11 illustrates an embodiment of a spacio-temporal awareness engine 1100. In some embodiments, engine 1100 may be utilized in 406 of FIG. 4. The spacio-temporal awareness engine 1100 comprises camera 1 1102, camera 2 1104, camera n 1106, low resolution converter 1108, image 1 1114, image 2 1116, image n 1118, anomaly detect 1120, and camera of interest 1122. The low resolution converter 1108 comprises the noise filter 1110 and feature consolidation 1112. The spacio-temporal awareness engine 1100 may be operated in accordance with the tree based region selection process 1200 and the tree-based region selection process 1300.

The spatial-temporal (spacio-temporal) awareness engine utilizes the limited resources available on an autonomous robotic systems (ARS) (e.g. drones, self driving cars, etc.). The spacio-temporal awareness engine utilizes a multi-camera view which is processed in parallel by a cascade of noise removal and super pixel feature consolidation and isolation algorithms to bring them to lower resolution images. These images are processed continuously using proprietary anomaly detection and populated in a probability distribution based priority quadtree and/or octree maps for further processing by the main high resolution tracking engine. An anomaly or change detection algorithm uses a combination of traditional edge and contour-based features in combination with a temporal prediction filter. The advantage of this two-tier architecture is the ability to reject and give prioritized areas for heavier, more computationally intensive algorithms.

On a fixed compute budget there is a negative relation between robustness of an algorithm and the cost and/or latency of the algorithm per spacio-temporal frame. Tight restrictions on available compute cycles limit the responsiveness of the system, especially on autonomous or semi-autonomous drones. By combining multiple algorithms in a way that achieves high combined frame rate with higher quality prediction, the system improves outcomes on a limited resource budget. Deep neural networks (DNN) may be executed to periodically detect objects and distinguish targets. A main high resolution tracking engine executes high-speed feature-based tracking based on disparity of similarity features with live adaptation.

In addition, the system employs color features and model predictions (Kalman/Particle filters etc.) to filter pixel domain inconsistencies. Once an object is detected in high-resolution mode (i.e. using DNN or manual input) a tracker algorithm takes control and maintains lock on the target. Applying different tracking algorithms and DNN based detections of a target in the video frame provides robustness at a high compute cost. A reduced resource background tracker may incrementally predict the location of a target in the frame with low compute cost and average robustness. This optimization enables the coexistent application of advanced machine vision algorithms in addition specialized lower cost algorithms.

Described herein are means for optimizing input of video data that is processed to efficiently locate and track items of interest using different processing schemes in view of effectiveness confidence and local computing resources. An example implementation includes means for determining a response direction to locate and track items of interest to respond to changes in monitored video data.

An example implementation includes method comprising optimizing resources processing a video data stream from a mobile capture device using a set of processing schemes to track one or more items of interest. A performance score is associated with each processing scheme confidence to track the one or more items of interest. The method includes repeatedly determining an active processing scheme based on the processing scheme with the highest performance score from the set of processing schemes. In response to the performance score of the active processing scheme failing to satisfy a threshold, the method selects another processing scheme to process the video data stream. Processing the video data stream can include identifying one or more items, classifying each of the items; and tracking one or more of items as an item of interest based on the classification. Processing the video data stream can include noise filtering and feature consolidation.

According to an example, selecting another processing scheme is based on determining a number of items of interest in the video data stream. The set of processing schemes can utilize different resource levels to process the video data stream. In an example, the set of processing schemes process the video data stream using different resolutions. The performance scores can be re-calculated based on a trigger, a resource threshold, or a time interval. For example, the threshold can be based on available computing resources associated with the mobile capture device.

In another example implementation, a system can include a video capture module, a sensor module, a control module, and one or more processors to direct control based on a detected change in a region of interest monitored by the video capture module or the sensor module. According to an example implementation, the one or more processors are configured to monitor multiple regions of interest in video data from the video capture module, and in response to detecting a change in a region of interest, determine a response direction for the control module based on the sensor module, wherein the response direction indicates an approximate location for an item of interest. The region of interest can include tracking an item of interest and the change in a region of interest includes not detecting the item of interest in the region of interest. For example, when an item of interest being tracked is not detected in the area of interest, the sensor module can be used to detect the response direction in view of a last detected location for the item of interest.

The system can control the video capture module, a navigation system of the control module, or feedback interface based on the response direction. For example, based on the response direction indicating an updated location for the item interest, cameras can be moved or re-focused, flight code can be updated, or visual feedback provided directed towards a possible location using the response direction. The updated location can be an approximate or predicted area based on the monitored video data and/or sensor data. The sensor module can include sensors coupled to the control module or the video capture module and/or receive sensor readings from external sensor systems, such as ground-based sensors including radar, radio frequency, proximity, acoustic, thermal imaging, night vision, and global positioning system sensors.

In further example implementation, a system includes a video capture module and one or more processors configured to process a video data stream using a set of processing schemes to track one or more items of interest, where a performance score is associated with the confidence of each processing scheme to track the one or more items of interest, wherein an active processing scheme is repeatedly determined based on the processing scheme with the highest performance score from the set of processing schemes. In response to the performance score of the active processing scheme failing to satisfy a threshold, the one or more processors select another processing scheme to process the video data stream.

The system can include a sensor module, where the one or more processors are further configured to: monitor multiple regions of interest in video data stream; and in response to detecting a change in a region of interest, determine a response direction based on the sensor module, wherein the response direction indicates an approximate location for an item of interest. The sensor module can receive readings from at least one of a radar, a radio frequency, proximity, acoustic, thermal imaging, night vision, and global positioning system sensors. In response to detecting the change, the one or more processors are further configured to at least one of control a navigation system, an interface, and the video capture module based on the response direction.

Figure 12:
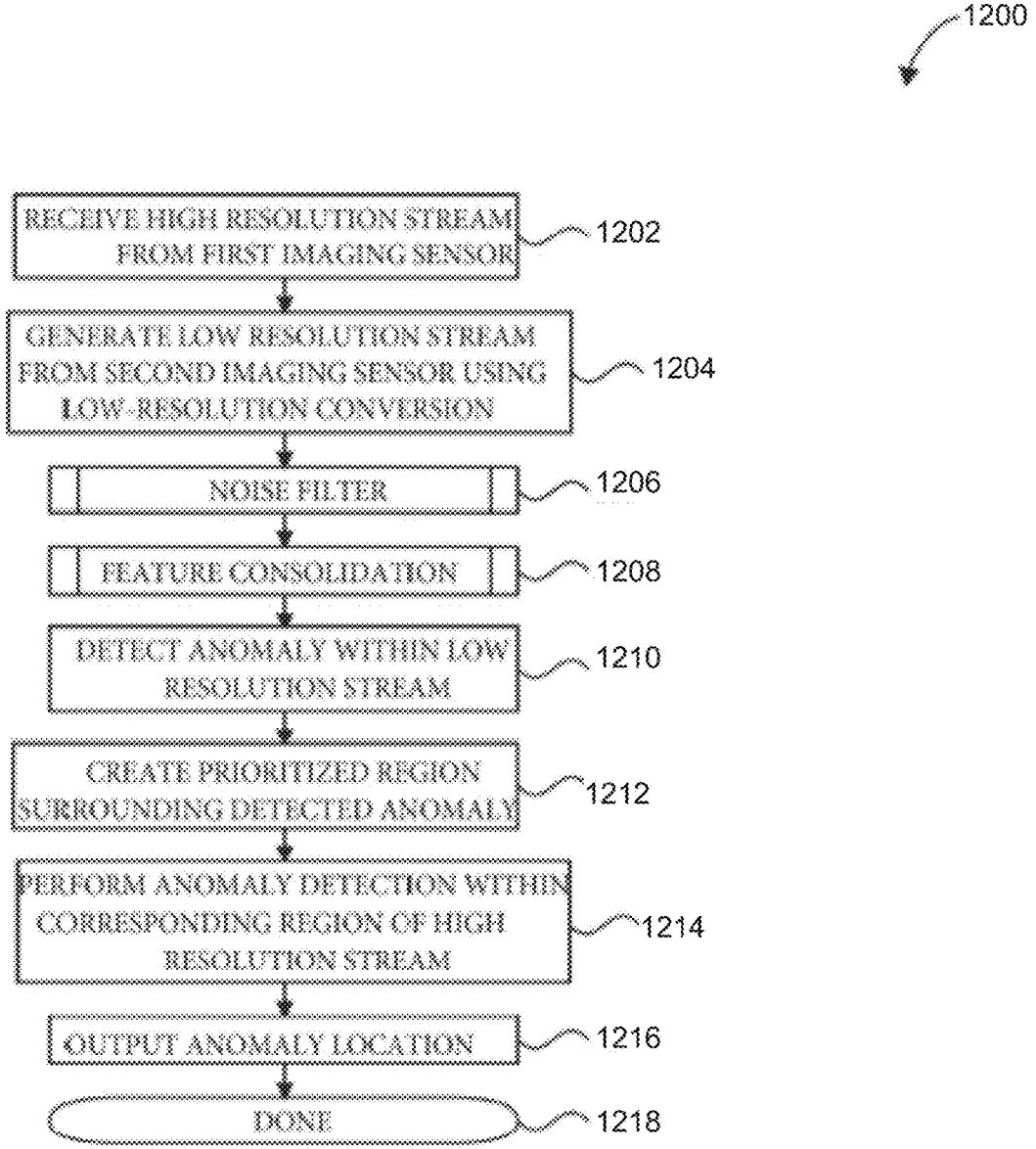
FIG. 12 illustrates an embodiment of a tree based region selection process.

FIG. 12 illustrates an embodiment of a tree based region selection process. At least a portion of the process of FIG. 12 may be performed in 406 of FIG. 4. Referring to FIG. 12, in block 1202, tree based region selection process 1200 receives a high resolution stream from a first imaging sensor. In block 1204, tree based region selection process 1200 generates a low resolution stream from a second imaging sensor using a low-resolution conversion. In subroutine block 1206, tree based region selection process 1200 noise filters. In subroutine block 1208, tree based region selection process 1200 feature consolidation. In block 1210, tree based region selection process 1200 detects an anomaly within the low resolution stream. In block 1212, tree based region selection process 1200 creates a prioritized region surrounding the detected anomaly. In block 1214, tree based region selection process 1200 performs anomaly detection within a corresponding region of the high resolution stream. In block 1216, tree based region selection process 1200 outputs the anomaly location. In done block 1218, tree based region selection process 1200 ends.

Figure 13:
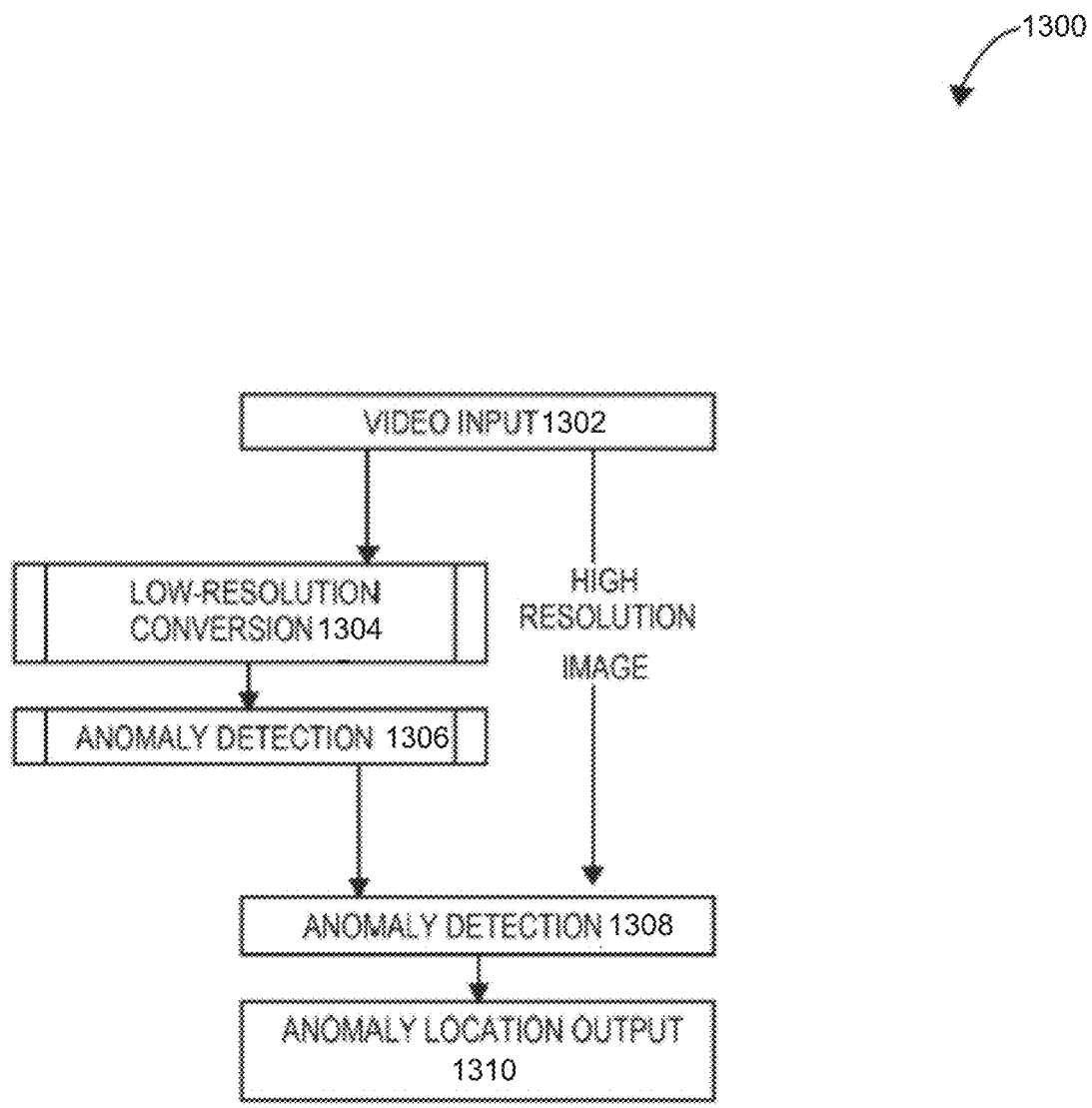
FIG. 13 illustrates an embodiment of a tree-based region selection process.

FIG. 13 illustrates an embodiment of a tree-based region selection process. At least a portion of the process of FIG. 13 may be performed in 406 of FIG. 4. Referring to FIG. 13, in block 1302, tree based tree-based region selection process 1300 receives a video input from a plurality of cameras. In subroutine block 1304, applies a low-resolution conversion. In subroutine block 1306, the tree-based region selection process 1300 detects anomalies in the video input. In block 1308, the tree-based region selection process 1300 detects anomalies within the region of interest in the high-resolution image. In block 1310 the tree-based region selection process 1300 outputs the anomaly location.

Figure 14:
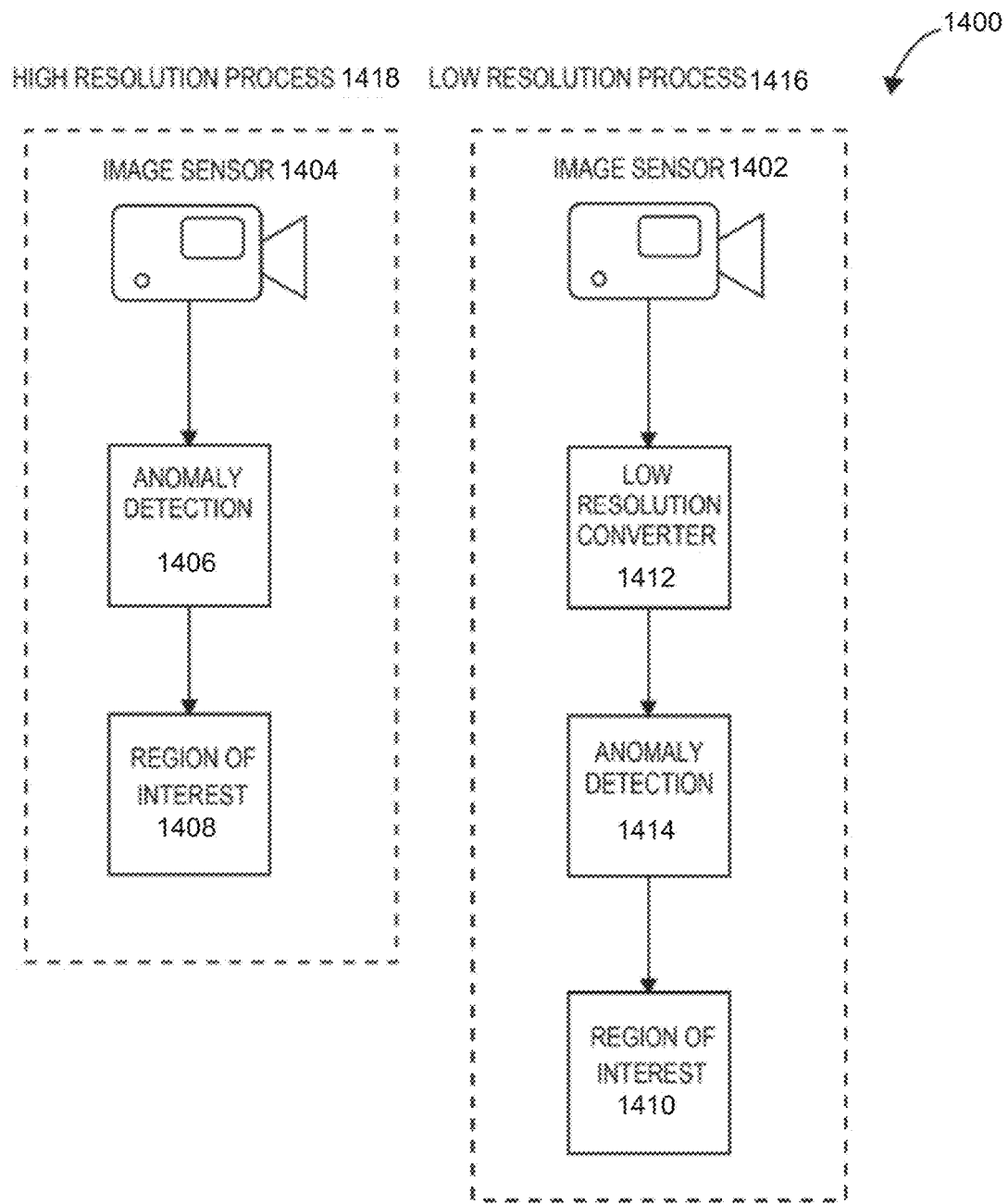
FIG. 14 illustrates an embodiment of parallel image processing process 1400.

FIG. 14 illustrates an embodiment of parallel image processing process 1400. At least a portion of the process of FIG. 14 may be performed in 406 of FIG. 4. The parallel image processing process 1400 comprises the high resolution process 1418 and the low resolution process 1416. The high resolution process 1418 comprises image sensor 1404, anomaly detection 1406, and region of interest 1408. The low resolution process 1416 comprises the image sensor 1402, the low resolution converter 1412, the anomaly detection 1414, and the region of interest 1410.

Figure 15:
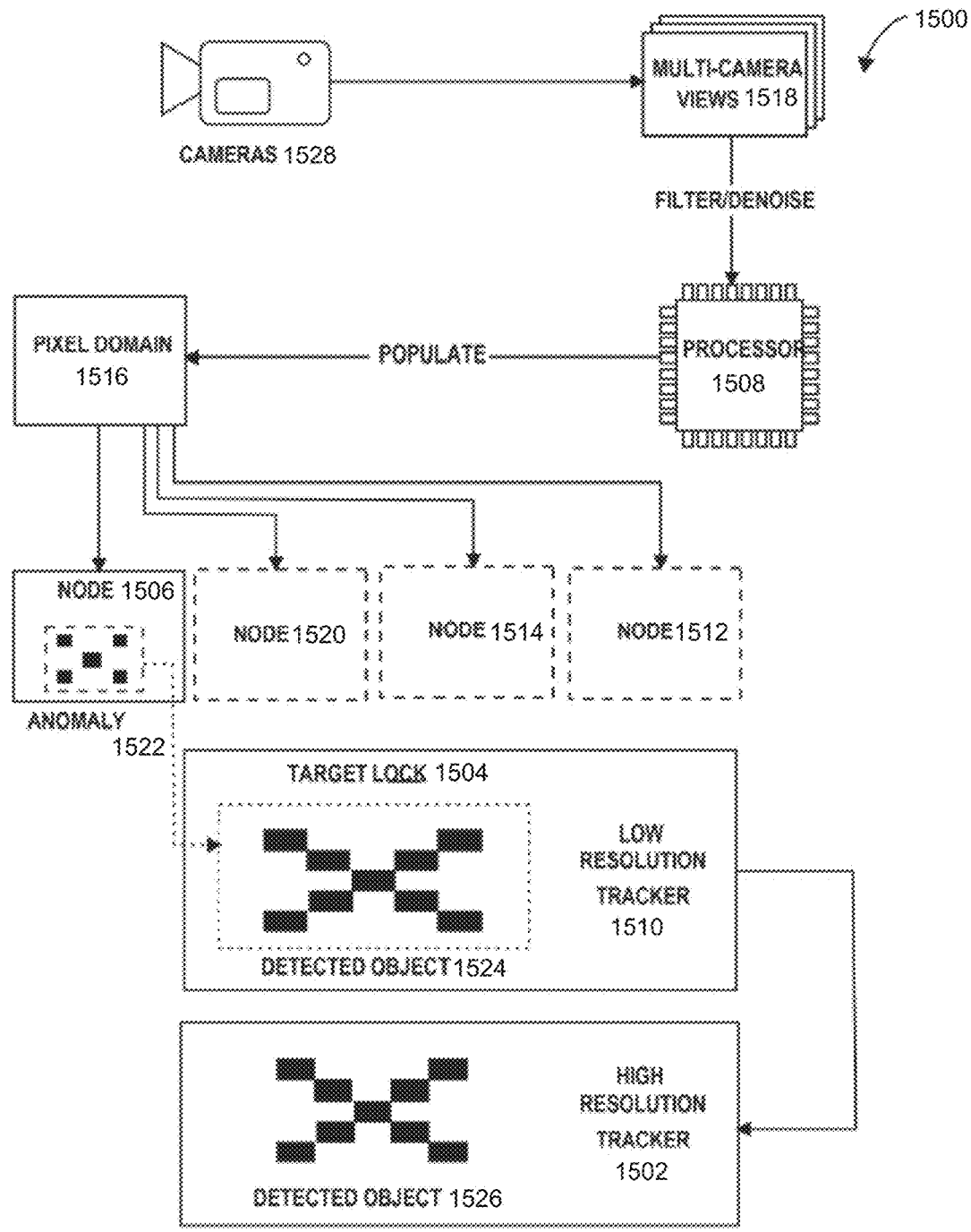
FIG. 15 illustrates a tracking system 1500 in accordance with one embodiment.

FIG. 15 illustrates a tracking system 1500 in accordance with one embodiment. One or more components of system 1550 may be utilized in 406 of FIG. 4. The tracking system 1500 comprises a cameras 1528 producing multi-camera views 1518 that are input to a processor 1508. The processor operates to filter and de-noise the multi-camera views 1518 to populate a pixel domain 1516. The pixel domain 1516 is divided into nodes (e.g., node 1506, node 1520, node 1514, and node 1512 that are then analyzed by a high resolution tracker 1502. Output of the high resolution tracker 1502 is input to a fast, low power consumption low resolution tracker 1510. In this example, the node 1506 comprises an anomaly 1522. The high resolution tracker 1502 identifies the anomaly 1522 as a detected object 1524, which is then tracked by the low resolution tracker 1510.

Figure 16:
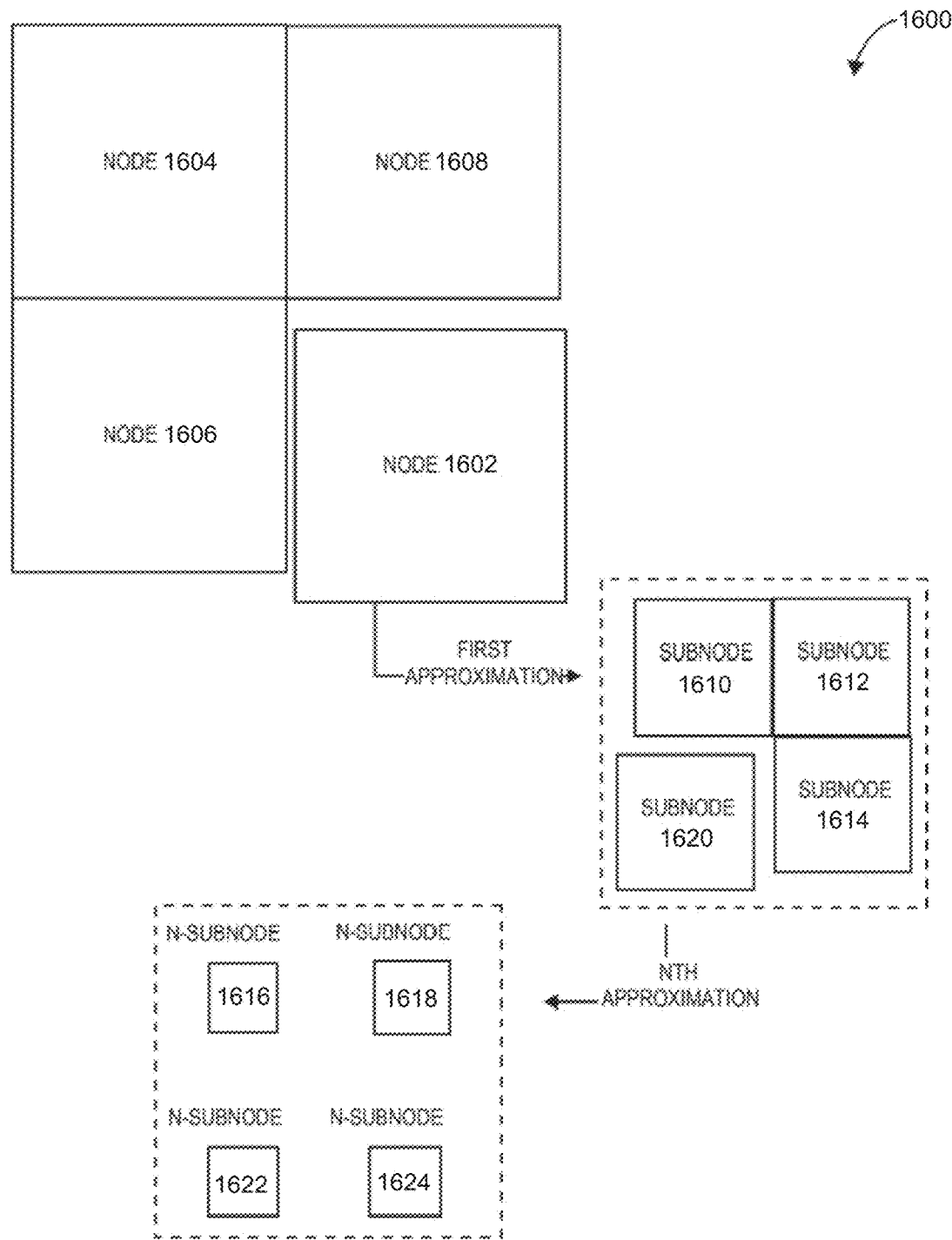
FIG. 16 illustrates an embodiment of a quadtree 1600.

FIG. 16 illustrates an embodiment of a quadtree 1600. The quadtree 1600 comprises: node 1604, node 1608, node 1606, subnode 1610, subnode 1612, subnode 1614, n-subnode 1616, n-subnode 1618, n-subnode 1622, and n-subnode 1624.

Two dimensional areas are recursively subdivided into quarters. For example, node 1602 may be divided into subnode 1610, subnode 1612, subnode 1614, and subnode 1620. Subnode 1620 may be divided into n-subnode 1616, n-subnode 1618, n-subnode 1622, and n-subnode 1624. In this example, an input image is divided into node 1604, node 1608, node 1606, and node 1602. Based on a resolution and probability target, node 1602 is selected as the most likely to contain the drone. Node 1602 is then divided into subnode 1610, subnode 1612, subnode 1620 and subnode 1614, and the process is repeated n-times to an nth approximation until the resolution and probability target is reached. In this manner, a region of interest is determined.

Figure 17:
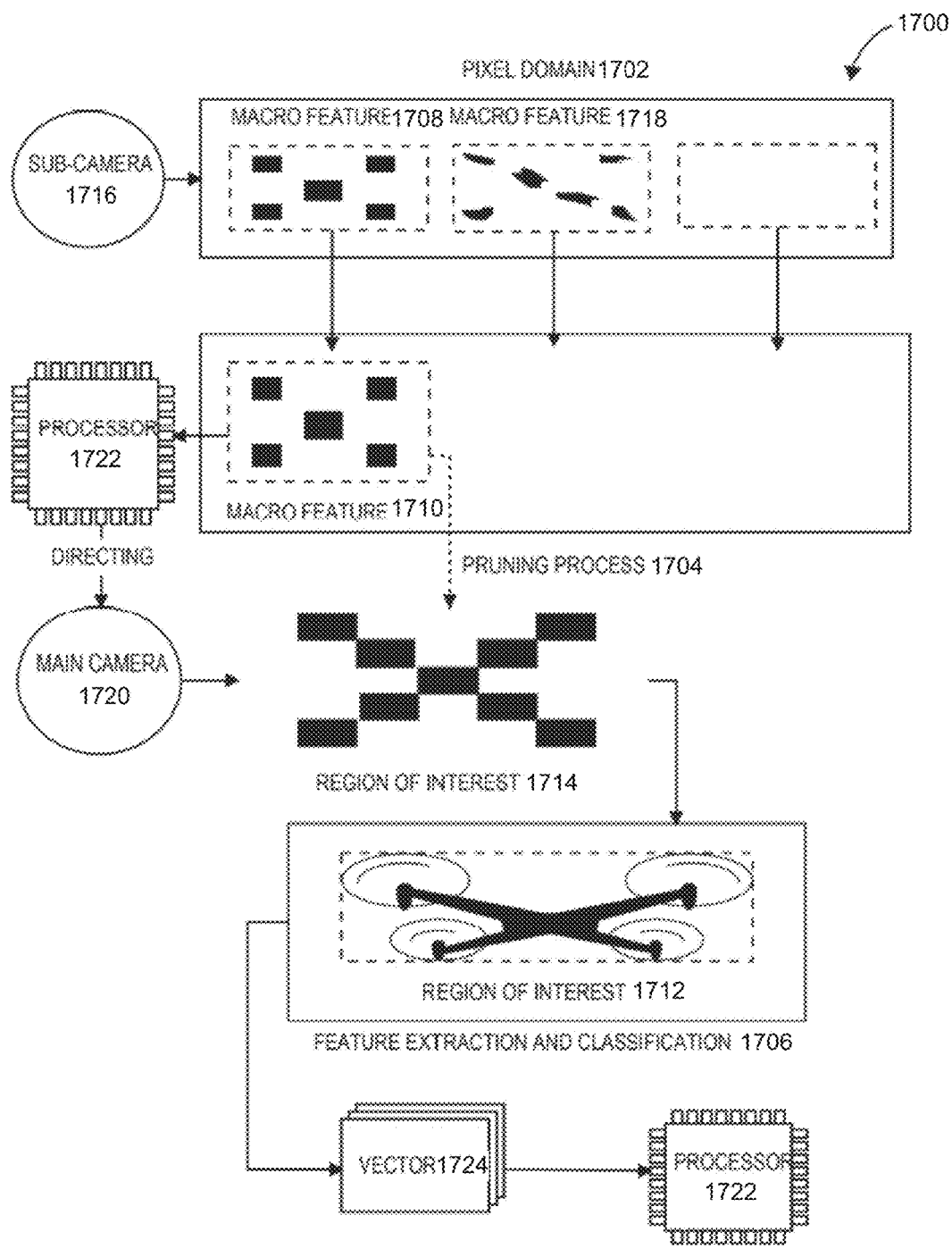
FIG. 17 illustrates an embodiment of a system 1700 for converting camera input into a vector for low resolution tracker 1510.

FIG. 17 illustrates an embodiment of a system 1700 for converting camera input into a vector for low resolution tracker 1510. One or more components of system 1700 may be utilized in 406 of FIG. 4. One of the system cameras (e.g., sub-camera 1716) generates a pixel domain 1702 image including sets of macrofeatures (e.g., macro feature 1718 and macro feature 1708). By operation of a processor 1722, these undergo a pruning process 1704 to generate more specific (pruned) macro features (e.g., macro feature 1710). In this example, macro feature 1718 was pruned as being characteristic of a non-target object (e.g., a bird in flight).

Primary macro features are identified from the pruned set as a region of interest 1714 and vectorized (converted from the pixel domain to a vector or parameterized description) into a region of interest 1712 using a feature extraction and classification 1706 process. This results in a final vector 1724 that may be applied to operate a mitigation system and direct the drone's main camera 1720.

Figure 18:
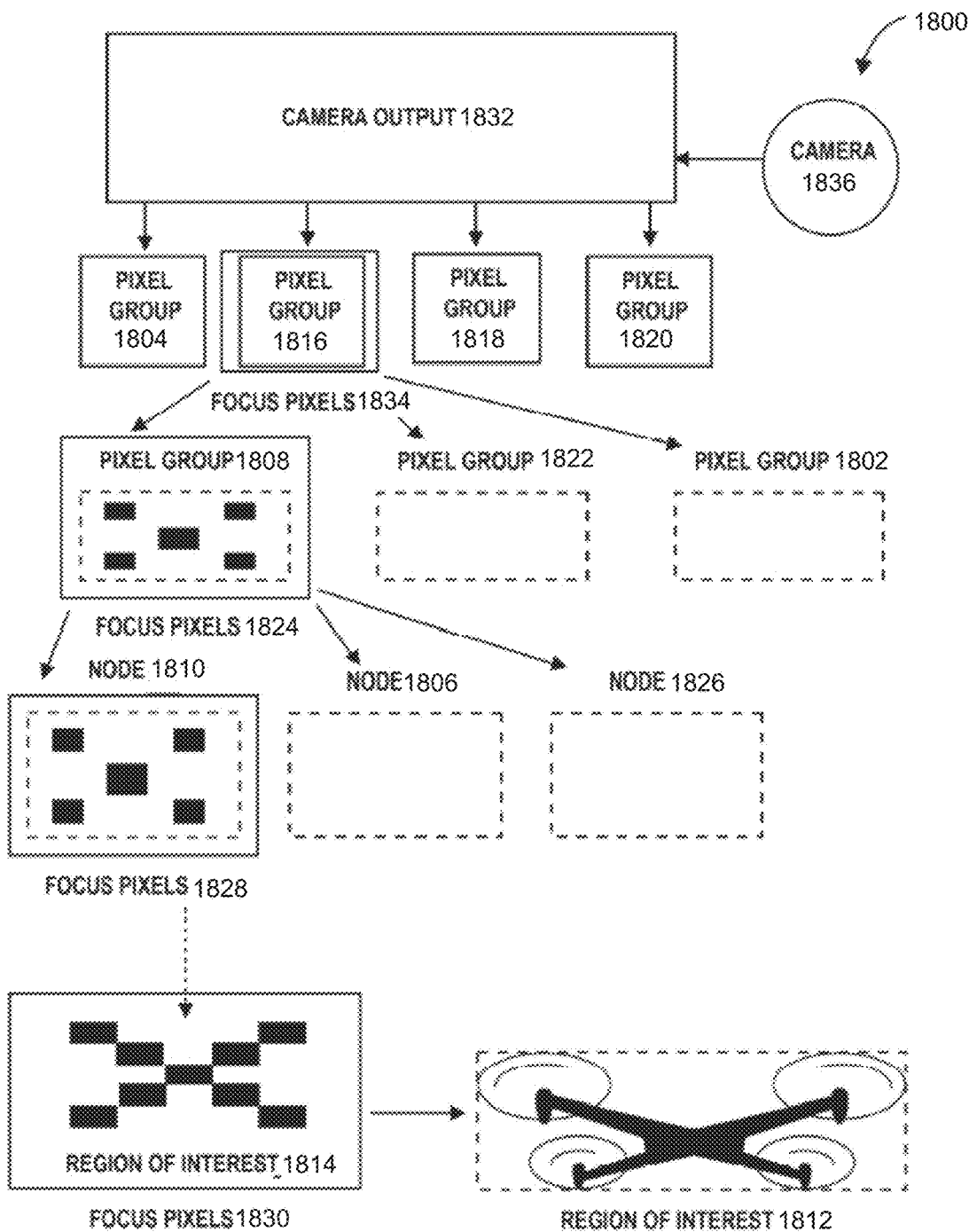
FIG. 18 illustrates an embodiment of a subsystem 1800 for prioritizing a region of interest in the focus of a camera.

FIG. 18 illustrates an embodiment of a subsystem 1800 for prioritizing a region of interest in the focus of a camera. One or more components of subsystem 1800 may be utilized in 406 of FIG. 4. A camera 1836 produces a camera output 1832 that is divided into pixel groups (pixel group 1804, pixel group 1816, pixel group 1818, and pixel group 1820 in this example). The focus pixels 1834 includes pixel group 1816 that is divided into subgroups (pixel group 1808, pixel group 1822, pixel group 1802, etc.) The focus pixels 1824 include pixel group 1808 which is divided into nodes (node 1810, node 1806, node 1826 etc.) The focus pixels 1828 includes node 1810 from which the region of interest 1814 is identified, and focused, to produce focused region of interest 1812. In this manner, the focus of the camera 1836 is progressively narrowed onto the eventual region of interest 1812.

Figure 19:
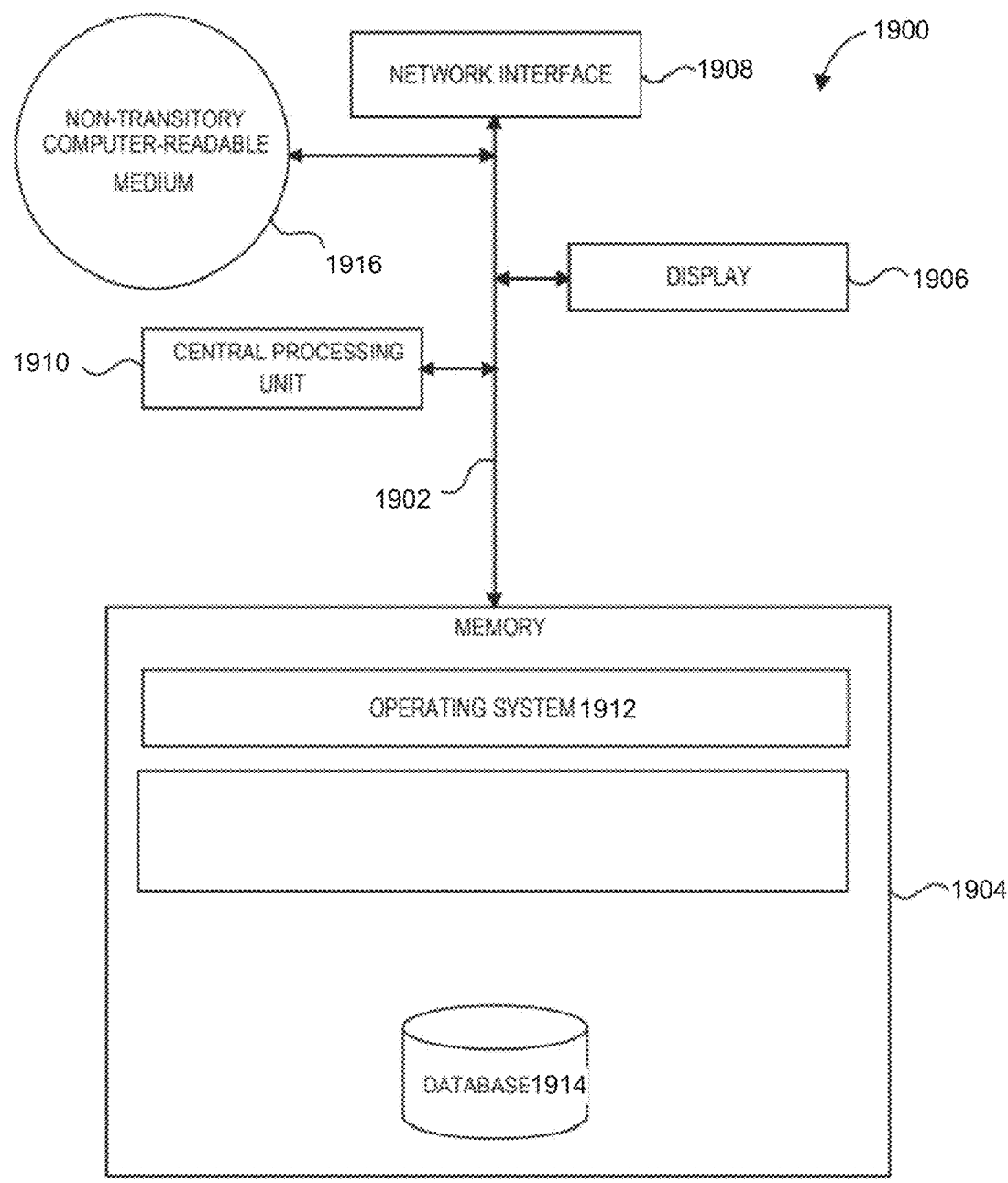
FIG. 19 illustrates several components of an exemplary region of interest tracking system 1900 in accordance with one embodiment.

FIG. 19 illustrates several components of an exemplary region of interest tracking system 1900 in accordance with one embodiment. One or more components of system 1900 may be utilized in 406 of FIG. 4. The region of interest tracking system 1900 may be included on a drone device (e.g., as a printed circuit board) to provide the capability to perform operations such as those described herein. In some embodiments, region of interest tracking system 1900 may include many more components than those shown in FIG. 19. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, the region of interest tracking system 1900 may comprise one or more physical and/or logical devices that collectively provide the functionalities described herein. In some embodiments, the region of interest tracking system 1900 may comprise one or more replicated and/or distributed physical or logical devices.

In some embodiments, the region of interest tracking system 1900 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Region of interest tracking system 1900 includes a bus 1902 interconnecting several components including a network interface 1908, a display 1906, a central processing unit 1910, and a memory 1904. Memory 1904 can comprises a random access memory ("RAM") and permanent non-transitory mass storage device, such as a hard disk drive or solid-state drive. Memory 1904 stores an operating system 1912. These and other software components may be loaded into a memory 1904 of the region of interest tracking system 1900 using a drive mechanism (not shown) associated with a non-transitory computer-readable medium 1916, such as a memory card, or the like. Memory 1904 also includes database 1914. In some embodiments, region of interest tracking system 1900 may communicate with database 1914 via network interface 1908, a storage area network ("SAN"), a high-speed serial bus, and/or via the other suitable communication technology. In some embodiments, database 1914 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

A multimodal sensor empowered awareness system for target recovery and object path prediction provides for a fast recovery of lost targets by empowering an autonomous robotic system (ARS) awareness engine with multimodal sensors. The system tracks targets visually using a combination of visual and acoustic tracking sensors.

The system employs a main tracking sensor (e.g., optical video) that feeds into a spatiotemoral engine on the ARS. Proximal sensors complement the main tracking sensor. Using non-visual fast processing sensors that give rough directionality of the signal allows for prioritization of the visual target scanning process. The sensors may include sound, RF, LIDAR, RADAR, GPS, and potentially other proximity sensors that do not isolate the location of a possible target, but provide a general direction to be scanned as a priority. The system may thus implement multi-object path and collision prediction.

Figure 20:
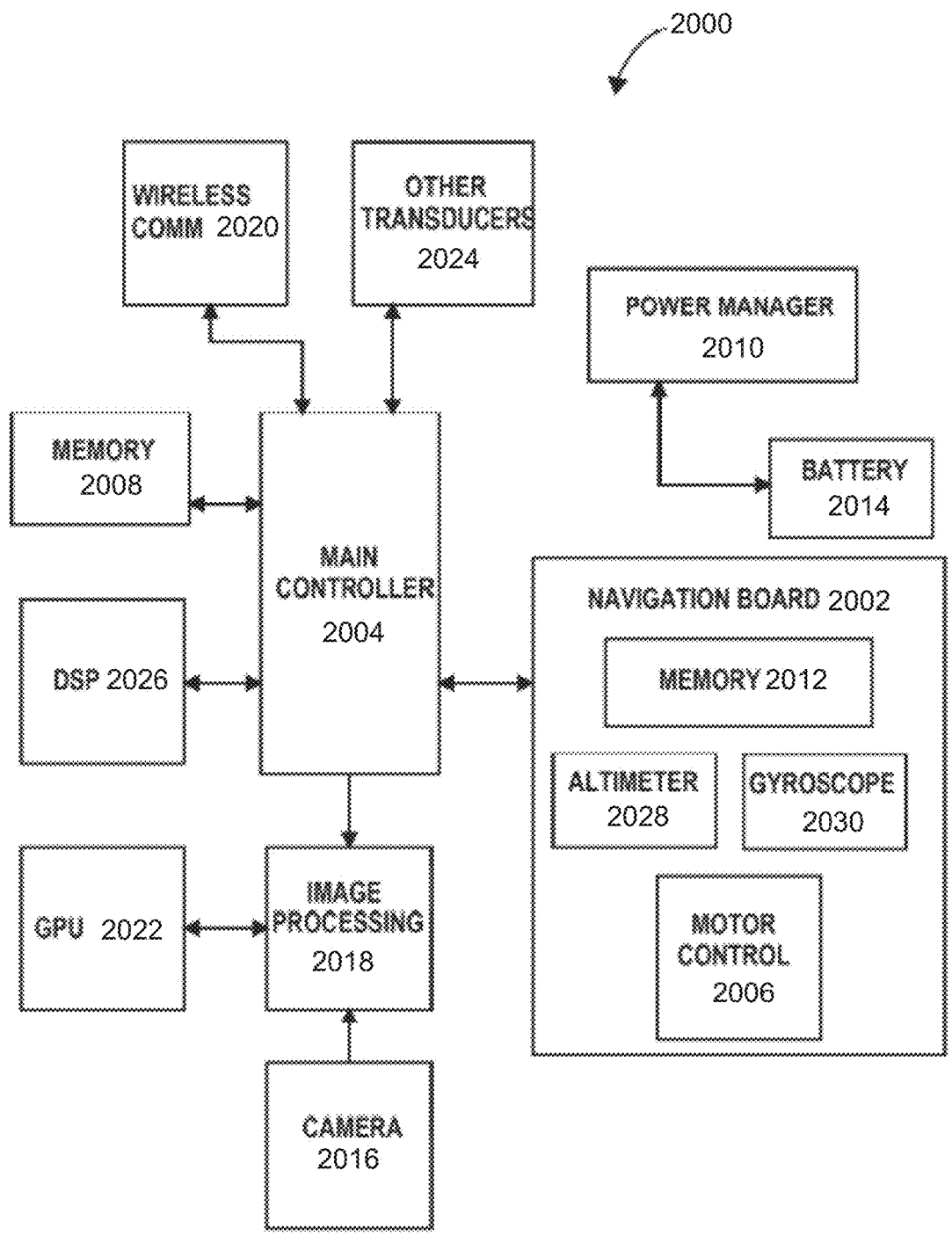
FIG. 20 illustrates an embodiment of drone operation logic.
Figure 21:
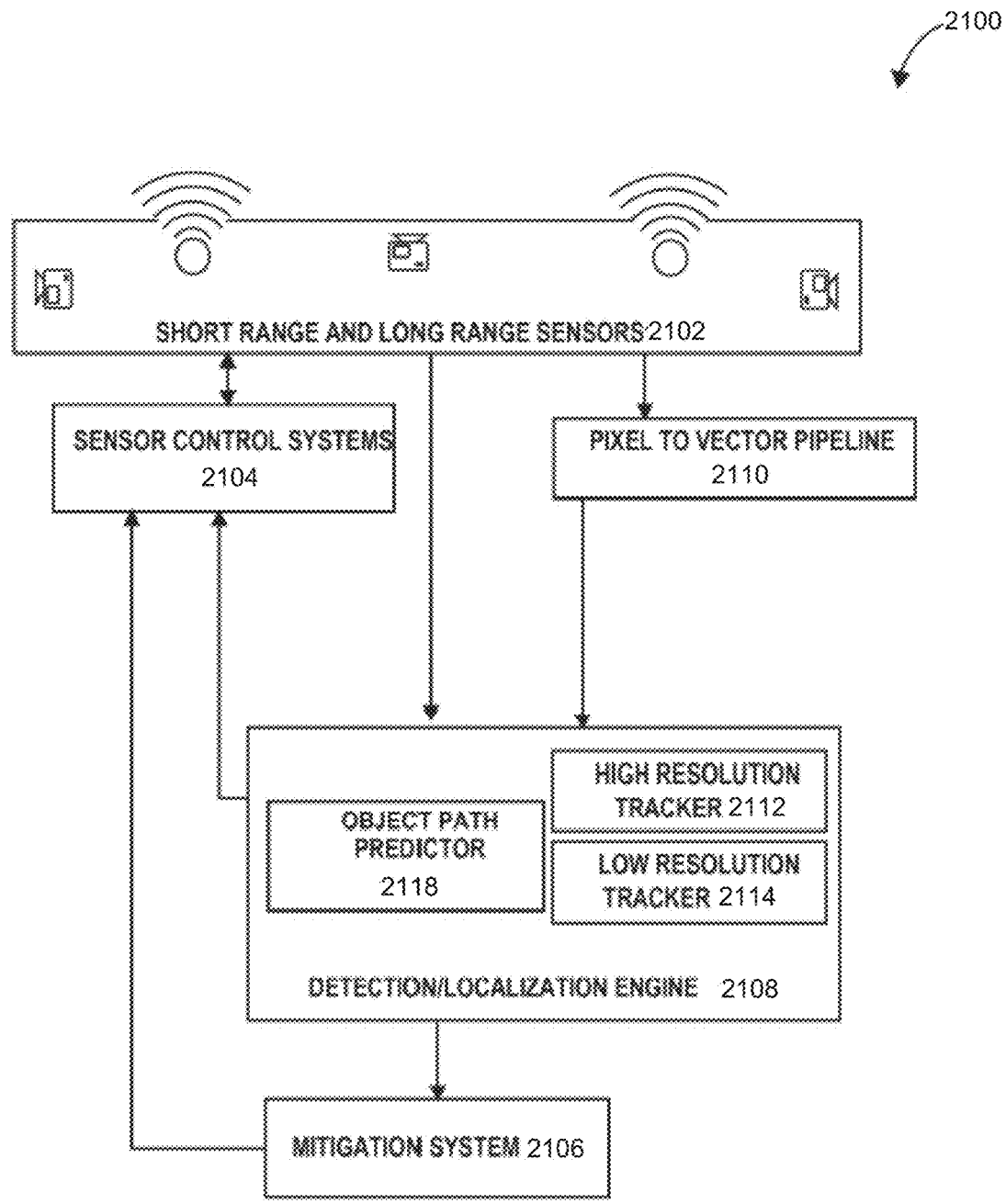
FIG. 21 illustrates an embodiment of a system operating a multimodal sensor empowered awareness engine.
Figure 22:
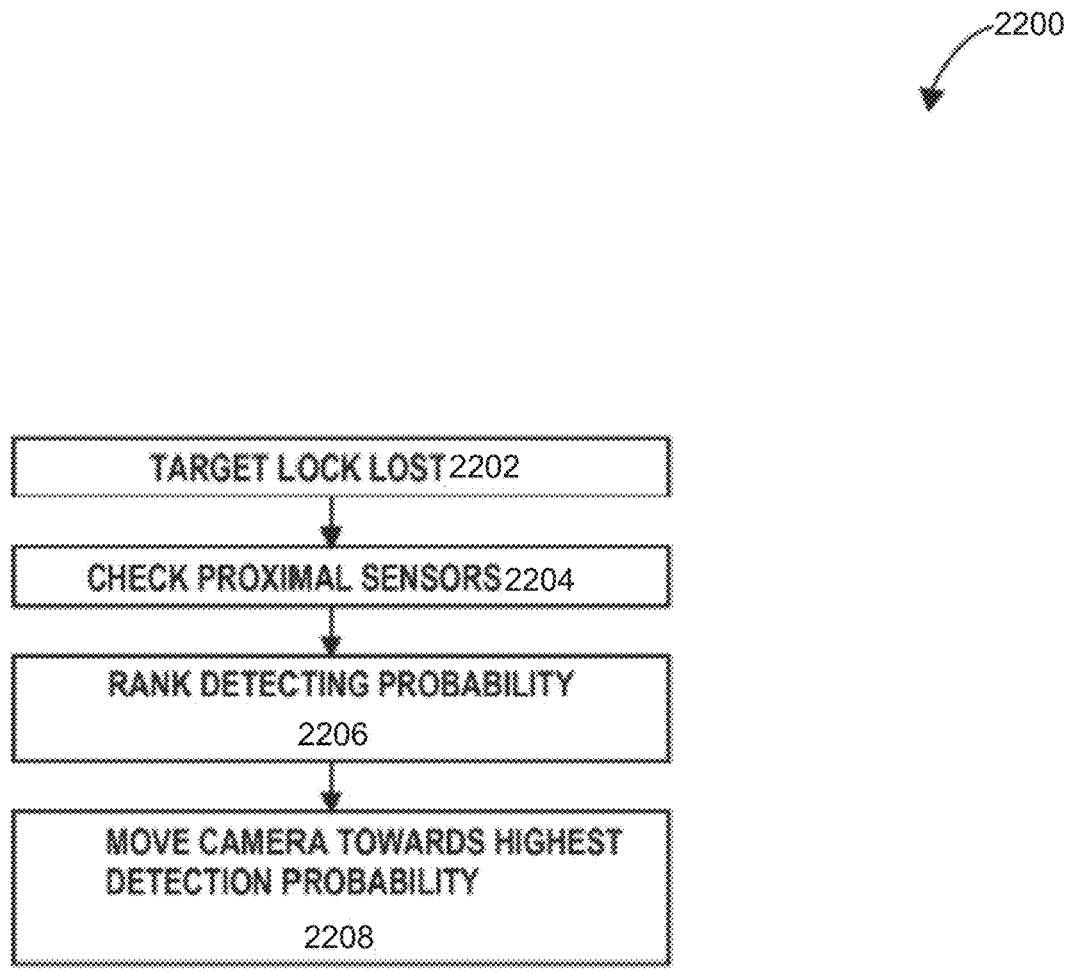
FIG. 22 illustrates an embodiment of a process for operating multimodal sensor empowered awareness engine.

FIG. 20 illustrates an embodiment of drone operation logic. The drone operation logic 2000 illustrated in FIG. 20 may be utilized to implement a system operating a multimodal sensor empowered awareness engine 2100 and a multimodal sensor empowered awareness engine 2200 as illustrated in FIG. 21 and FIG. 22, respectively.

Referring to FIG. 20, drone operation logic 2000 comprises a main controller 2004 that controls and coordinates the operation of other components as well as providing general computational capabilities (e.g., to execute image processing 2018). The main controller 2004 may comprise a central processing unit and/or one or more controllers or combinations of these components. The drone operation logic 2000 will typically comprise memory 2008 which may be utilized by the main controller 2004 and other components (e.g., the DSP 2026 and/or the GPU 2022) to read and write instructions (commands) and data (operands for the instructions).

At least one camera 2016 may interface to image processing 2018 logic to record images and video from the environment. The image processing 2018 may operate to provide image/video enhancement, compression, feature extraction, and other transformations, and provide these to the main controller 2004 for further processing and storage to memory 2008. The image processing 2018 may further utilize a navigation board 2002 and/or DSP 2026 toward these ends. Images and video stored in the memory 2008 may also be read and processed by the main controller 2004, DSP 2026, and/or the GPU 2022. The drone operation logic 2000 may operate on power received from a battery 2014. The battery 2014 capability, charging, and energy supply may be managed by a power manager 2010.

The drone operation logic 2000 may transmit wireless signals of various types and range (e.g., cellular, WiFi, Bluetooth, and near field communication i.e. NFC) using the wireless communication logic 2020 and/or other transducers 2024. The drone operation logic 2000 may also receive these types of wireless signals. Wireless signals are transmitted and received using one or more antenna. Other forms of electromagnetic radiation may be used to interact with proximate devices, such as infrared (not illustrated). The drone operation logic 2000 may include a navigation board 2002 which includes a motor control 2006 using flight code (to operate propellers and/or landing gear), an altimeter 2028, a gyroscope 2030, and local memory 2012.

Referencing FIG. 21, a system operating a multimodal sensor empowered awareness engine 2100 comprises a short range and long range sensors 2102, a sensor control systems 2104, a pixel to vector pipeline 2110, a detection/localization engine 2108, and a mitigation system 2106. The detection/localization engine 2108 comprises an object path predictor 2118, high resolution tracker 2112, and a low resolution tracker 2114. The system operating a multimodal sensor empowered awareness engine 2100 may be operated in accordance with the process described in FIG. 22.

Referencing FIG. 22, a multimodal sensor empowered awareness engine 2200 detects that a lock on the tracked target has been lost (block 2202). The multimodal sensor empowered awareness engine 2200 checks the proximal sensors to identify the lost target (block 2204). The multimodal sensor empowered awareness engine 2200 ranks the probability of detecting the target based object path prediction (block 2206). The multimodal sensor empowered awareness engine 2200 moves the camera towards a proximal sensor with the highest detection probability (block 2208).

Figure 23:
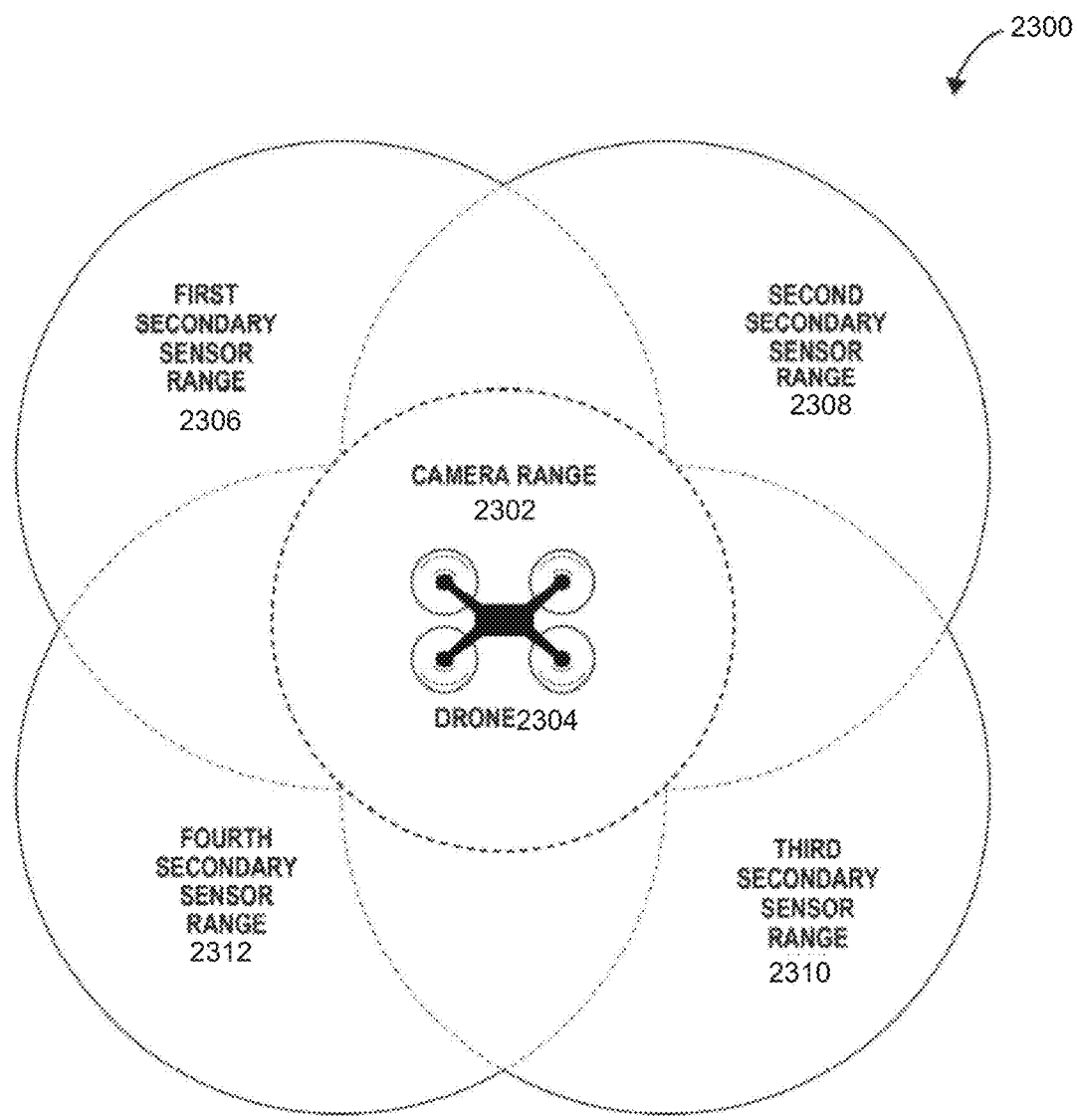
FIG. 23 illustrates an embodiment of a system operating a multimodal sensor empowered awareness engine.

Referencing FIG. 23, a system operating a multimodal sensor empowered awareness engine 2300 illustrates a drone 2304 comprising a camera range 2302 as the range of the main tracking sensor and a first secondary sensor range 2306, second secondary sensor range 2308, a third secondary sensor range 2310, and a fourth secondary sensor range 2312, as the range of the complementary proximal sensors.

Figure 24:
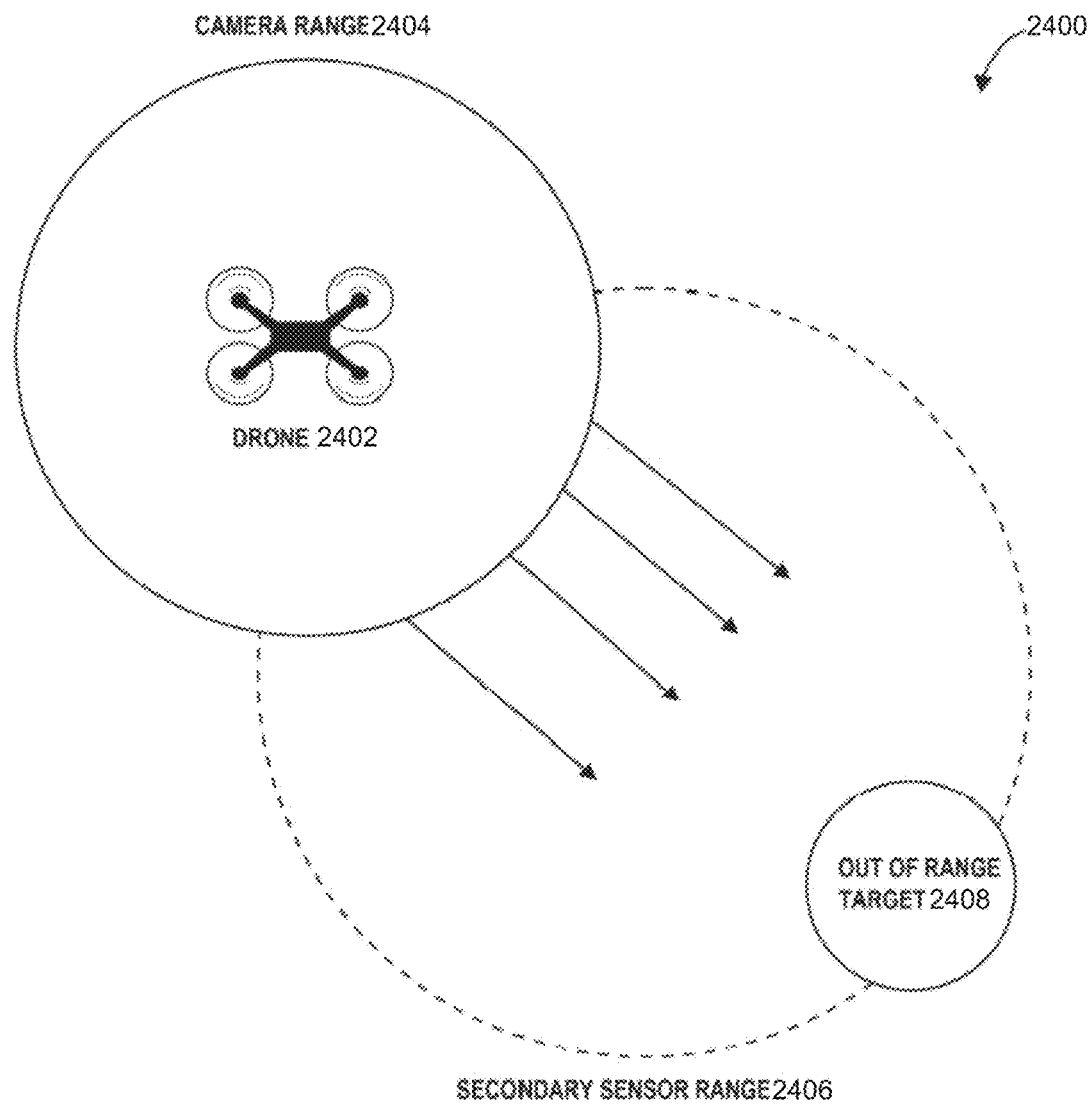
FIG. 24 illustrates an embodiment of a system operating a multimodal sensor empowered awareness engine.

Referencing FIG. 24, a system operating a multimodal sensor empowered awareness engine 2400 comprises a drone 2402 and an out of range target 2408 from a camera range 2404, in a secondary sensor range 2406.

An example aspect includes optimized video processing scheme scheduling. In an example implementation, processing schemes include localization algorithms that process video frames of one or more video data streams. The processing schemes produce a prediction of objects within the video fame, as well as a confidence number that is a measure of quality for that prediction. The confidence number can be normalized to a canonical range (0-1) and used to compare the confidence of each different processing scheme to track an item of interest.

Costs on all data inputs for the processing schemes can be pre-determined, estimated, or calculated. For example, a type of algorithm that operates on visual "features" can be dependent on the number of features in the video frame, and its cost estimated based on the number of features. As the number of features increases the cost can increase dramatically.

According to other examples, algorithms may differ in their effectiveness based on the type of input received. Robustness of each algorithm (e.g., processing scheme) can be compared by measuring a population of inputs that are selected as representative of sample conditions (e.g., real-life data sets) and prioritized by application requirements.

The example implementation can statically assign each processing scheme in a set of processing schemes to a group based on each processing scheme's determined cost and/or robustness estimations on the selected input group.

For example, processing schemes can be grouped as:
(i) High cost (low refresh rate), high robustness algorithm (e.g., processing schemes that produce an object location estimation independent of historical information);
(ii) Medium cost, medium robustness algorithms (e.g., processing schemes that use a last known location of the object location estimation and/or use a fast validation method to validate the estimation); or
(iii) Low cost (high refresh rate), low robustness algorithms (e.g., processing schemes that use a known location of the object location estimation and or a fast validation method to validate the estimation).

In an example implementation, a set of processing schemes (e.g., algorithms) are examined from group to group, and the process cycles through the processing schemes to produce a detection of an object. According to the example implementations, if the confidence number is higher than an activation number, an action is performed to stop or change a running group (i) and select or switch to group (ii). For example, a processing scheme from the group of (i) High cost (low refresh rate), high robustness algorithm can select a cheaper processing scheme from the group of (ii) Medium cost, medium robustness algorithms. Medium cost algorithms can be run from group (ii) in higher refresh rate, while monitoring the confidence level of the result.

According to an example implementation, a voting system is provided that fuses estimations from high confidence results, and validates the result with an independent validation method. If the confidence is below low threshold, falls outside of a range, or the validation method fails, group (i) processing is performed. If the confidence is determined to be high, then group (iii) algorithms can be applied to optimize resources. Different Groups of algorithms (e.g., group (iii) and group (ii)) may be similar and selected based on different secondary factors to optimize local computing resources. For example, group (iii) algorithms may operate like group (ii) with a similar validation method but have secondary factors such as faster and more brittle performance.

In an example implementation, processing schemes may have no confidence measure and depend solely on the validation method to determine a performance score or detect a failure. For example, if the confidence is low in group (iii) or the validation method fails, group (ii) processing is selected to be the active processing scheme for processing the video data.

In some examples, the input can allow the system to invoke the group or processing scheme from the set of processing schemes that can detect the object, and constantly optimize the processing scheme that isolates the object from the background detected in the video data. For example, a processing scheme may more efficiently process video data to detect and track items from a white background.

Processing scheme examples for a group (i) High cost (low refresh rate)—high robustness can include modified tiny You only look once (YOLO) Convolutional Neural Networks (CNN) on 448 pixels input tiles in the frame; a modified SSD (Single Shot Detection) CNN on 300 pixels multi-scale classification; a modified Faster R-CNN (Region Proposal Networks), segmentation analysis of the frame+classifier for each candidate, etc.

Processing scheme examples for a group (ii) & (iii) can include using SqueezeNet super fast rejection CNN as the validation method on the estimated location produced by the algorithms. A 227 pixels input can be run in the location predicted by the algorithms and used as a part of the score for the result estimation. Group (ii) Medium cost—medium robustness processing scheme examples can include: color-based tracking—hue, saturation, value (HSV) channel statistical modeling; feature based tracking—Oriented FAST and rotated BRIEF (ORB) features+descriptors, consensus of movement of keypoints (optical flow); movement based tracking—ego-motion compensation and background subtraction, etc.

Group (iii) Low-cost—low robustness processing scheme may have no confidence measure and depend solely on the validation method to determine a performance score and/or detect a failure. Group (iii) Low-cost—low robustness processing scheme examples can include: extrapolation of location of object from past locations (e.g., no confidence measure (always max), depend on validation method to reject estimation, etc.); SqueezeNet super fast rejection CNN; template matching to the last known object appearance based on past detections, etc.

The foregoing algorithms are examples, and the present inventive concept is not limited thereto. Other example algorithms may be substituted therefor without departing from the inventive scope, as would be understood by those skilled in the art. References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones.

Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list, and any combination of the items in the list, unless expressly limited to one or the other. "Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device.

Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Those skilled in the art will appreciate that logic may be distributed throughout one or more devices, and/or may be comprised of combinations of memory, media, processing circuits and controllers, other circuits, and so on. Therefore, in the interest of clarity and correctness, logic may not always be distinctly illustrated in drawings of devices and systems, although it is inherently present therein.

The techniques and procedures described herein may be implemented via logic distributed in one or more computing devices. The particular distribution and choice of logic will vary according to implementation. Those having skill in the art will appreciate that there are various logic implementations by which processes and/or systems described herein can be affected (e.g., hardware, software, and/or firmware), and that the preferred vehicle will vary with the context in which the processes are deployed.

"Software" refers to logic that may be readily readapted to different purposes (e.g. read/write volatile or nonvolatile memory or media). "Firmware" refers to logic embodied as read-only memories and/or media. "Hardware" refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware.

Hence, there are several possible vehicles by which the processes described herein may be effected, none of which are inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware. The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof.

Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented individually and/or collectively, by a wide range of hardware, software, firmware, or any combination thereof, can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of performing a flight control operation of a reference aerial vehicle, comprising:
receiving an image captured by an image sensor of the reference aerial vehicle;
detecting a target in the image including by applying a machine learning model to the image to identify a portion of the image that includes the target;
determining a three-dimensional relative location of the target with respect to the reference aerial vehicle based on the image including by determining a distance to the target based at least in part on a size of the target detected within the image; and
performing the flight control operation based on the three-dimensional relative location of the target with respect to the reference aerial vehicle, wherein performing the flight control operation includes determining a speed adjustment factor based on a magnitude of deviation of a direction of the three-dimensional relative location with respect to a current flight direction of the reference aerial vehicle.

2. The method of claim 1, wherein the reference aerial vehicle is a multirotor unmanned aerial vehicle and the target is an aerial vehicle.

3. The method of claim 1, wherein performing the flight control operation includes one or more of the following: turning the reference aerial vehicle towards the target, adjusting a speed of the reference aerial vehicle, or engaging a mechanism to capture the target.

4. The method of claim 1, wherein detecting the target in the image includes identifying a model type of the target.

5. The method of claim 1, wherein detecting the target in the image includes identifying a bounding box outlining a portion of the image that includes detected features of the target.

6. The method of claim 5, wherein determining the three-dimensional relative location of the target includes determining the distance to the target based on an area of the bounding box of the target within the image.

7. The method of claim 1, wherein determining the three-dimensional relative location of the target includes determining the distance to the target based on a size of the target within the image and a physical size corresponding to an identified type for the target.

8. The method of claim 7 wherein performing the flight control operation includes determining a speed adjustment factor based on the determined distance to the target.

9. The method of claim 1, wherein determining the three-dimensional relative location of the target includes determining a direction of the target with respect to the reference aerial vehicle.

10. The method of claim 1, wherein determining the three-dimensional relative location of the target includes determining an azimuth angle and an altitude angle to the target from the reference aerial vehicle.

11. The method of claim 1, wherein determining the three-dimensional relative location of the target includes converting a two-dimensional vector to a three-dimensional vector representing the three-dimensional relative location.

12. The method of claim 1, further comprising:
receiving a geographical location associated with the target detected at least in part using a ground-based sensor;
autonomously navigating the reference aerial vehicle towards the received geographical location; and
determining to allow image-based navigation.

13. The method of claim 1, wherein the speed adjustment factor is greater for a smaller magnitude of deviation as compared to for a greater magnitude of deviation.

14. The method of claim 1, wherein performing the flight control operation includes scaling a speed adjustment factor to smooth and limit a rate of change of a speed of the reference aerial vehicle.

15. The method of claim 1, wherein performing the flight control operation includes determining a direction adjustment factor based on a magnitude of deviation of a direction of the three-dimensional relative location with respect to a current flight direction of the reference aerial vehicle.

16. The method of claim 15, wherein performing the flight control operation includes scaling the direction adjustment factor to smooth and limit a rate of change of a direction of the reference aerial vehicle.

17. The method of claim 1, wherein the distance to the target is determined based at least in part using a radar.

18. The method of claim 1, wherein it is determined to allow the image-based navigation based on whether the reference aerial vehicle is within a threshold distance away from the received geographical location.

19. A reference aerial vehicle, comprising:
an image sensor configured to capture an image;
a processor configured to:
detect a target in the image; and
determine a three-dimensional relative location of the target with respect to the reference aerial vehicle based on the image; and
a flight controller configured to perform a flight control operation based on the three-dimensional relative location of the target with respect to the reference aerial vehicle, wherein the flight controller is configured to perform the flight control operation including by being configured to determine a speed adjustment factor based on a magnitude of deviation of a direction of the three-dimensional relative location with respect to a current flight direction of the reference aerial vehicle.

20. A computer program product for performing a flight control operation of a reference aerial vehicle, the computer program product being embodied in a non-transitory computer readable storage medium and comprising computer instructions for:
receiving an image captured by an image sensor of the reference aerial vehicle;
detecting a target in the image including by applying a machine learning model to the image to identify a portion of the image that includes the target;
determining a three-dimensional relative location of the target with respect to the reference aerial vehicle based on the image including by determining a distance to the target based at least in part on a size of the target detected within the image; and
performing the flight control operation based on the three-dimensional relative location of the target with respect to the reference aerial vehicle, wherein performing the flight control operation includes determining a speed adjustment factor based on a magnitude of deviation of a direction of the three-dimensional relative location with respect to a current flight direction of the reference aerial vehicle.

\* \* \* \* \*